United States Patent [19]
Wyse

[11] 3,943,778
[45] Mar. 16, 1976

[54] MULTIGIMBAL FLEXURE UNIVERSAL JOINT

[75] Inventor: Stanley F. Wyse, Encino, Calif.

[73] Assignee: Litton Systems, Inc., Woodland Hills, Calif.

[22] Filed: July 1, 1974

[21] Appl. No.: 484,433

[52] U.S. Cl. ................................. 74/5 F; 29/445
[51] Int. Cl.² ........................................ G01C 19/02
[58] Field of Search ........... 74/5.7, 5 F; 29/445, 558

[56] References Cited
UNITED STATES PATENTS

| | | | |
|---|---|---|---|
| 2,995,938 | 8/1961 | Brodersen et al. | 74/5.7 |
| 3,077,785 | 2/1963 | Stiles | 74/5 |
| 3,301,073 | 1/1967 | Howe | 74/5.7 |
| 3,354,726 | 11/1967 | Krupick et al. | 74/5 F |
| 3,427,828 | 2/1969 | Stiles | 64/15 |
| 3,527,062 | 9/1970 | Bilinski et al. | 64/15 |
| 3,538,776 | 10/1970 | Macor et al. | 74/5 F |
| 3,575,475 | 4/1971 | Boerner | 74/5 F |
| 3,585,866 | 6/1971 | Ensinger | 74/5 F |
| 3,614,894 | 10/1971 | Ensinger | 74/5 F |
| 3,678,764 | 7/1972 | Erdley et al. | 74/5 F |
| 3,700,289 | 10/1972 | Bilinski | 74/5 F X |
| 3,700,291 | 10/1972 | Hadland | 74/5 F X |
| 3,709,045 | 1/1973 | Krupick et al. | 74/5 F |
| 3,811,172 | 5/1974 | Bilinski et al. | 29/445 |
| 3,812,479 | 5/1974 | Witteles et al. | 340/173 LS |
| 3,856,366 | 12/1974 | Weisbord et al. | 308/2 A |

Primary Examiner—Charles J. Myhre
Assistant Examiner—William C. Anderson
Attorney, Agent, or Firm—Harold E. Gillmann

[57] ABSTRACT

A universal joint for small angle deflections having a driving element which is rotatable about an axis of rotation wherein the driving element is connected to a driven member by a suspension means which comprises at least two gimbal elements, each gimbal element is connected to the driving element and to the driven element by at least two flexure hinges, each of the longitudinal axes of the flexure hinges forming an angle of the same magnitude with the axes of rotation of the driving and driven elements when the universal joint is in a rest position. A method for fabricating such a multigimbal universal joint for small angle deflections in one-piece wherein integral flexure hinges having such longitudinal axes are provided by forming pairs of adjacent bores in a blank and wherein the driving elements, the driven element and at least two gimbal elements therebetween are formed by electrical discharge machine techniques.

33 Claims, 26 Drawing Figures

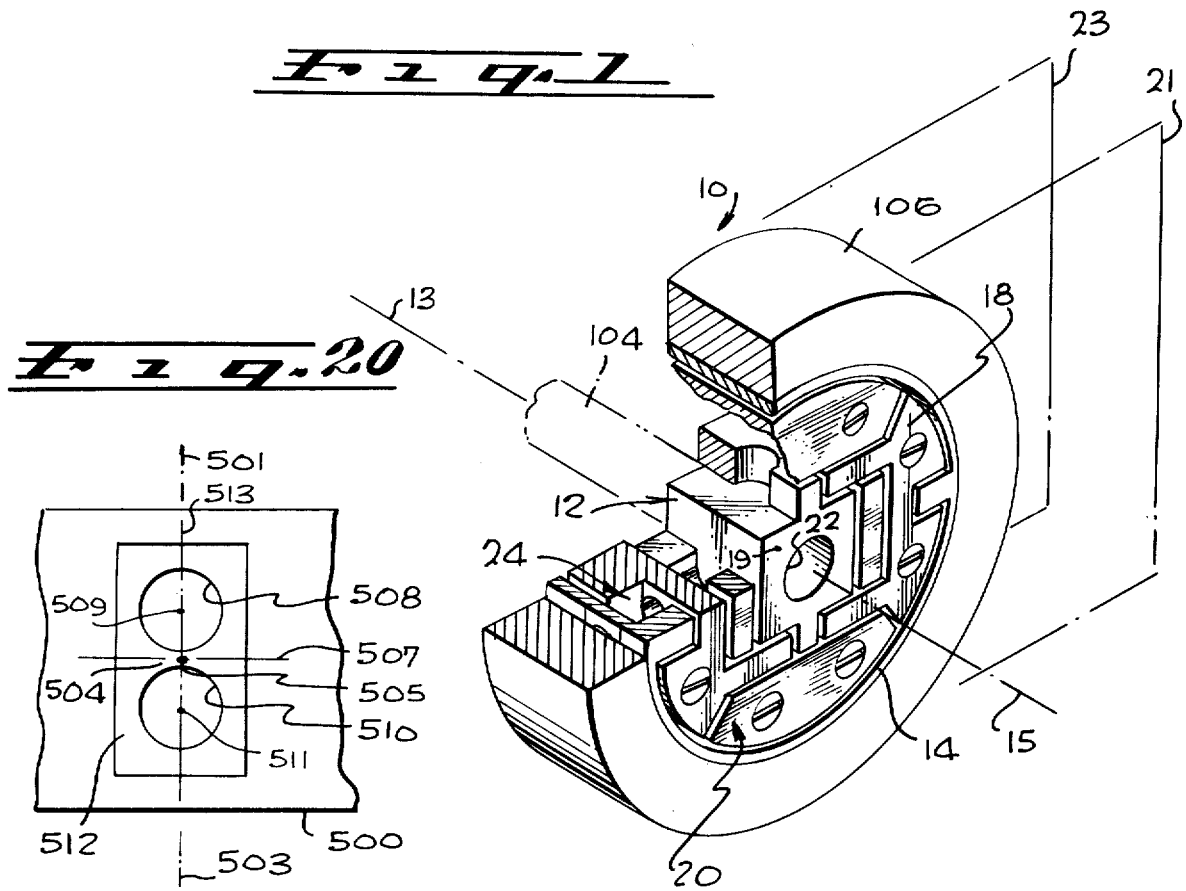
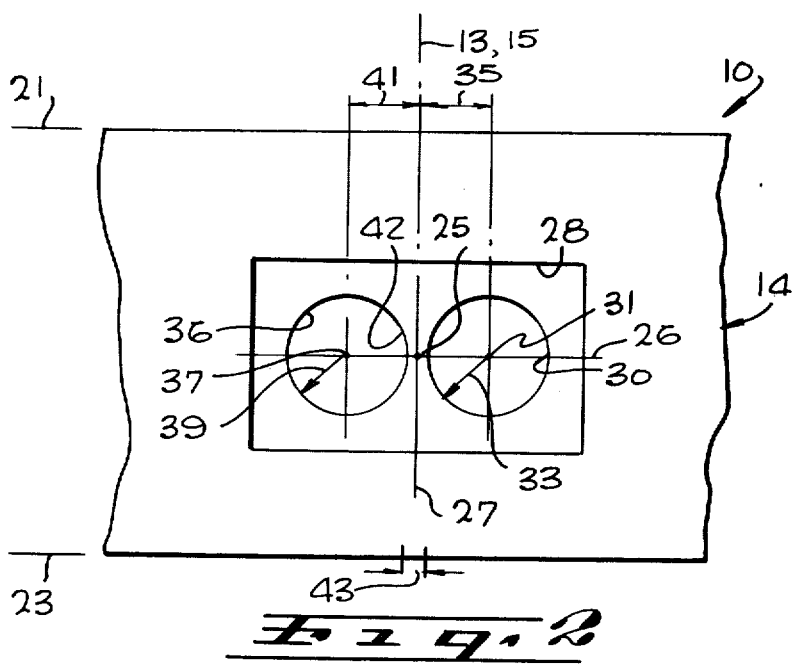

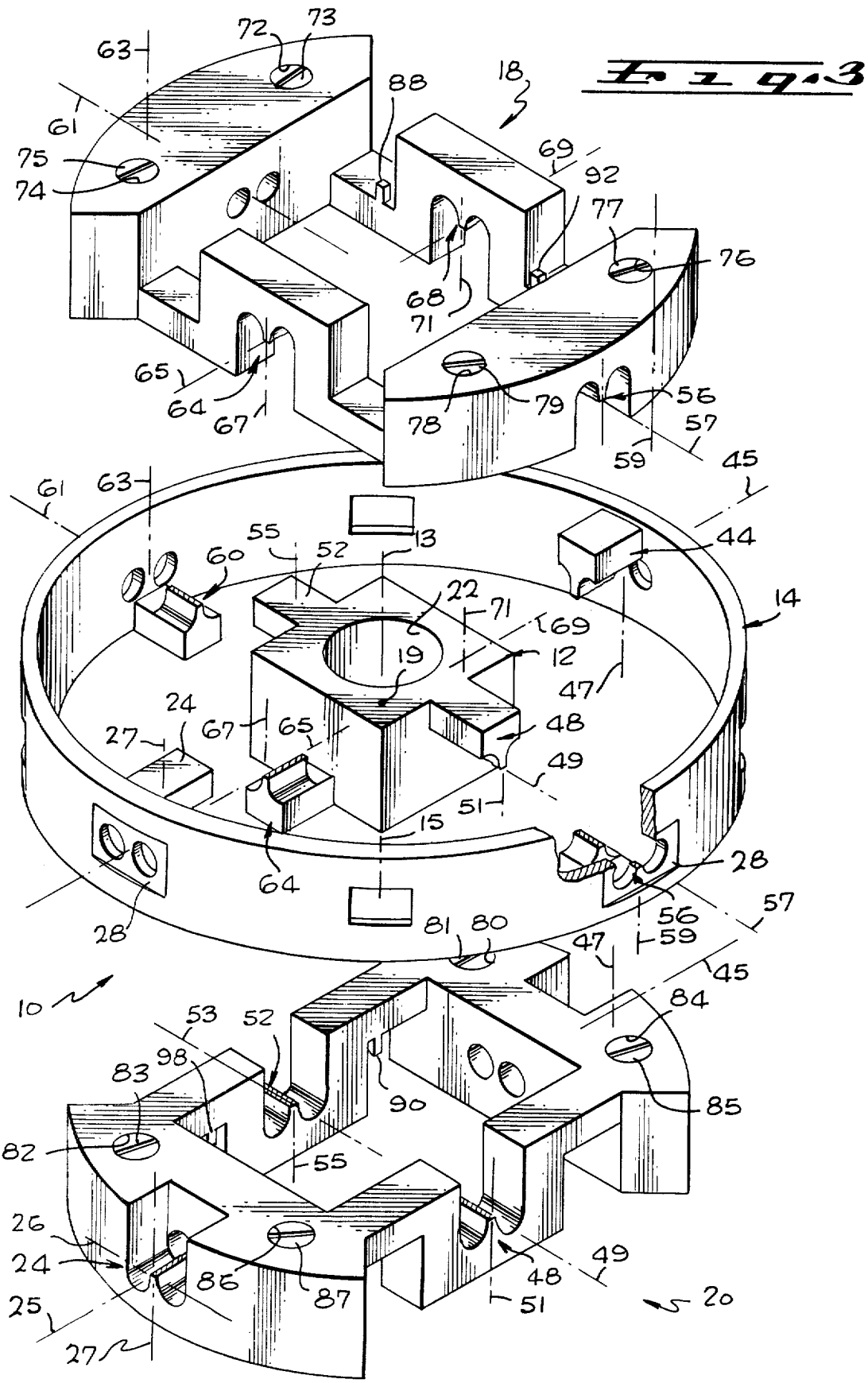

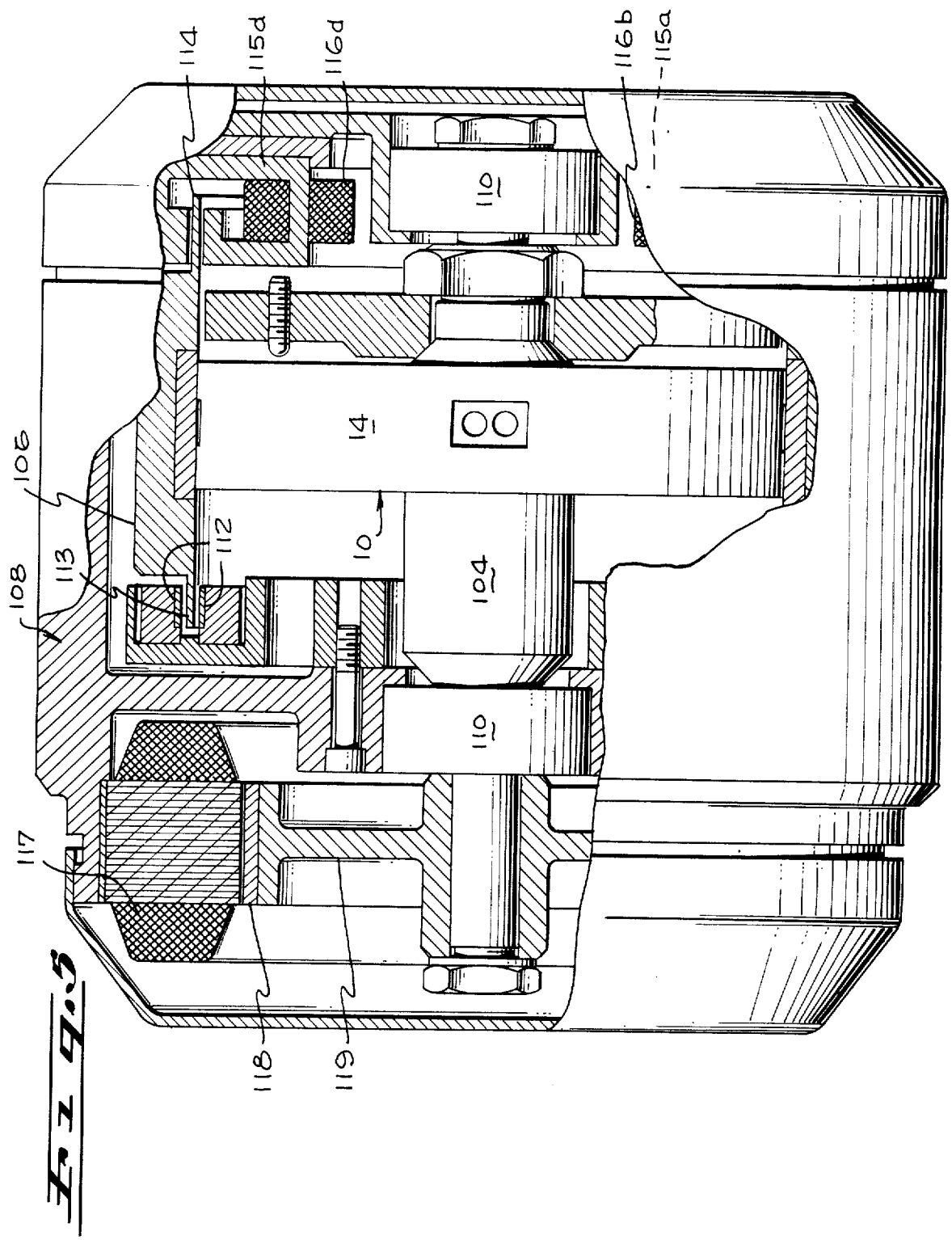

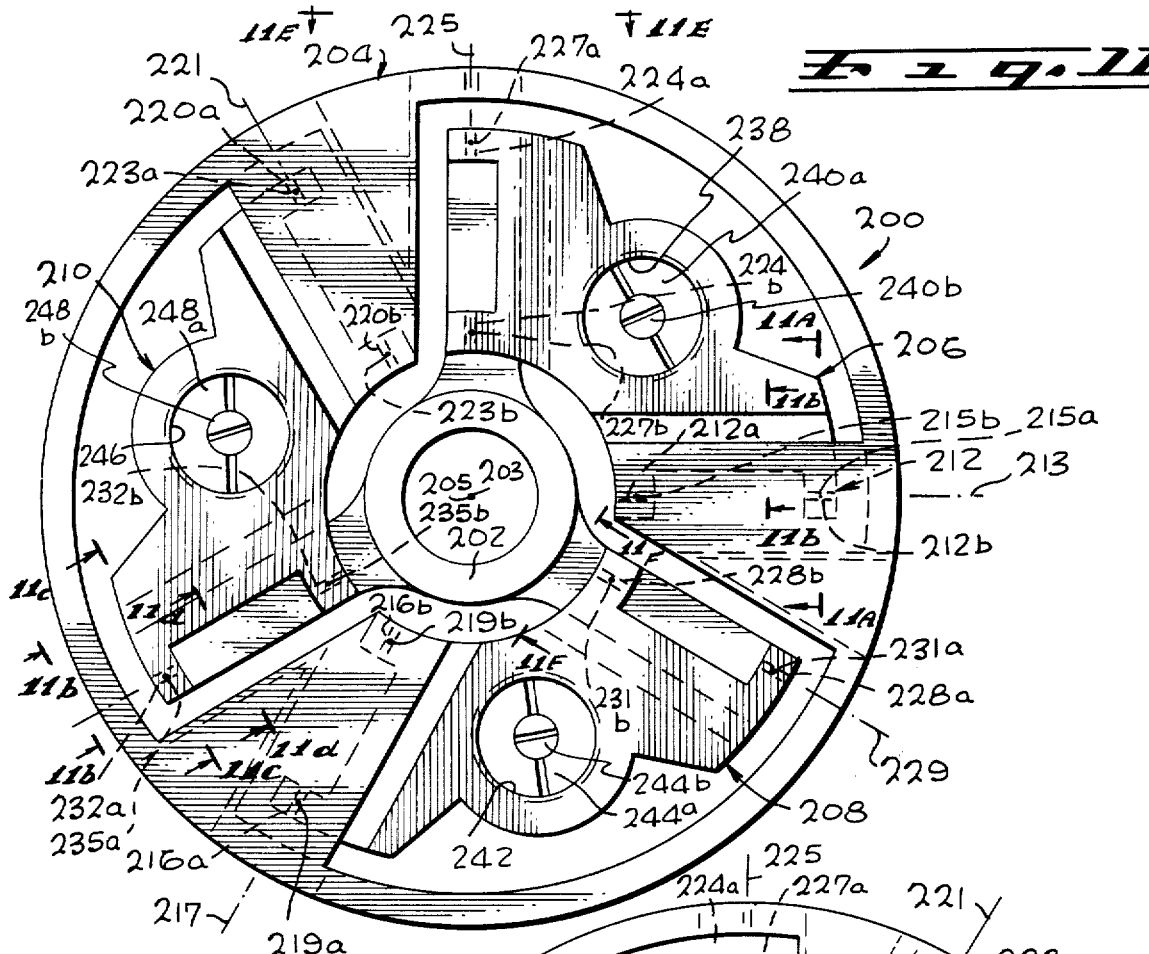
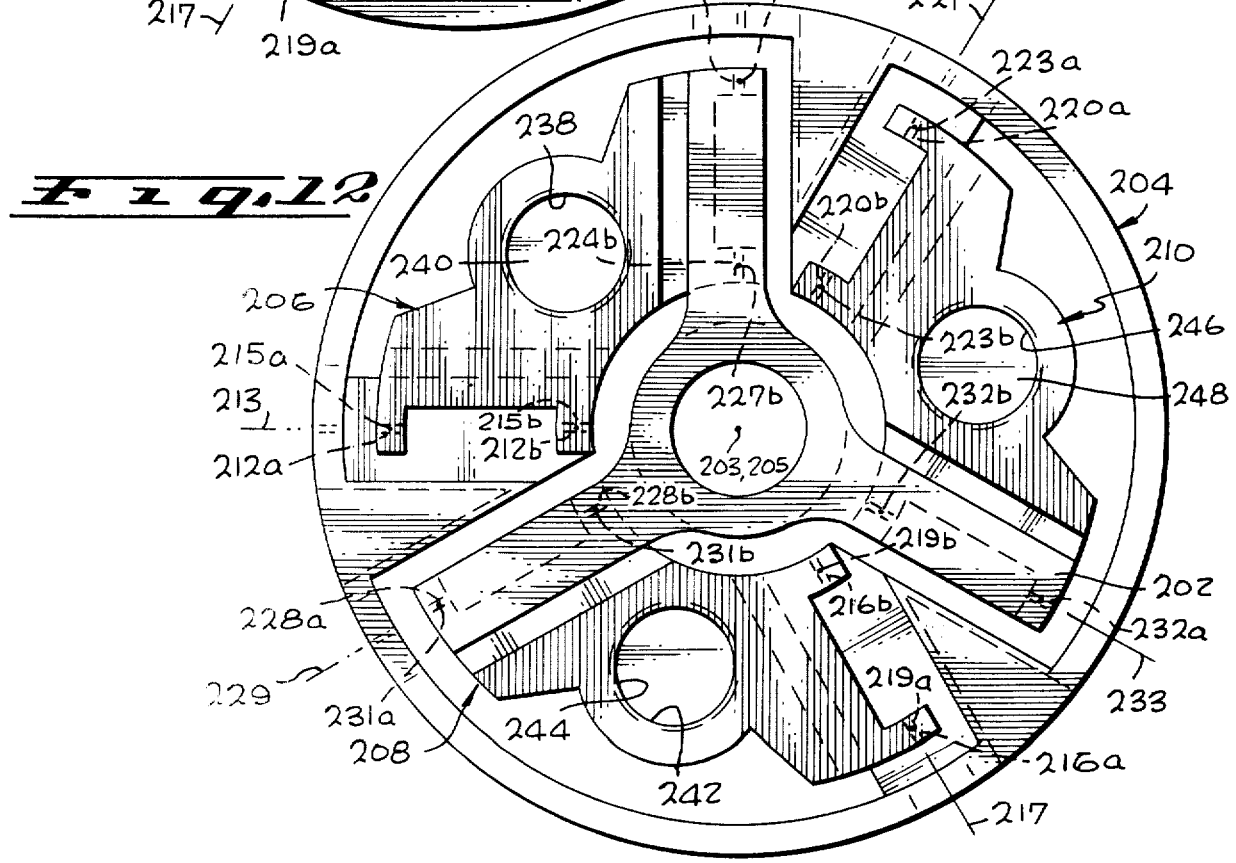

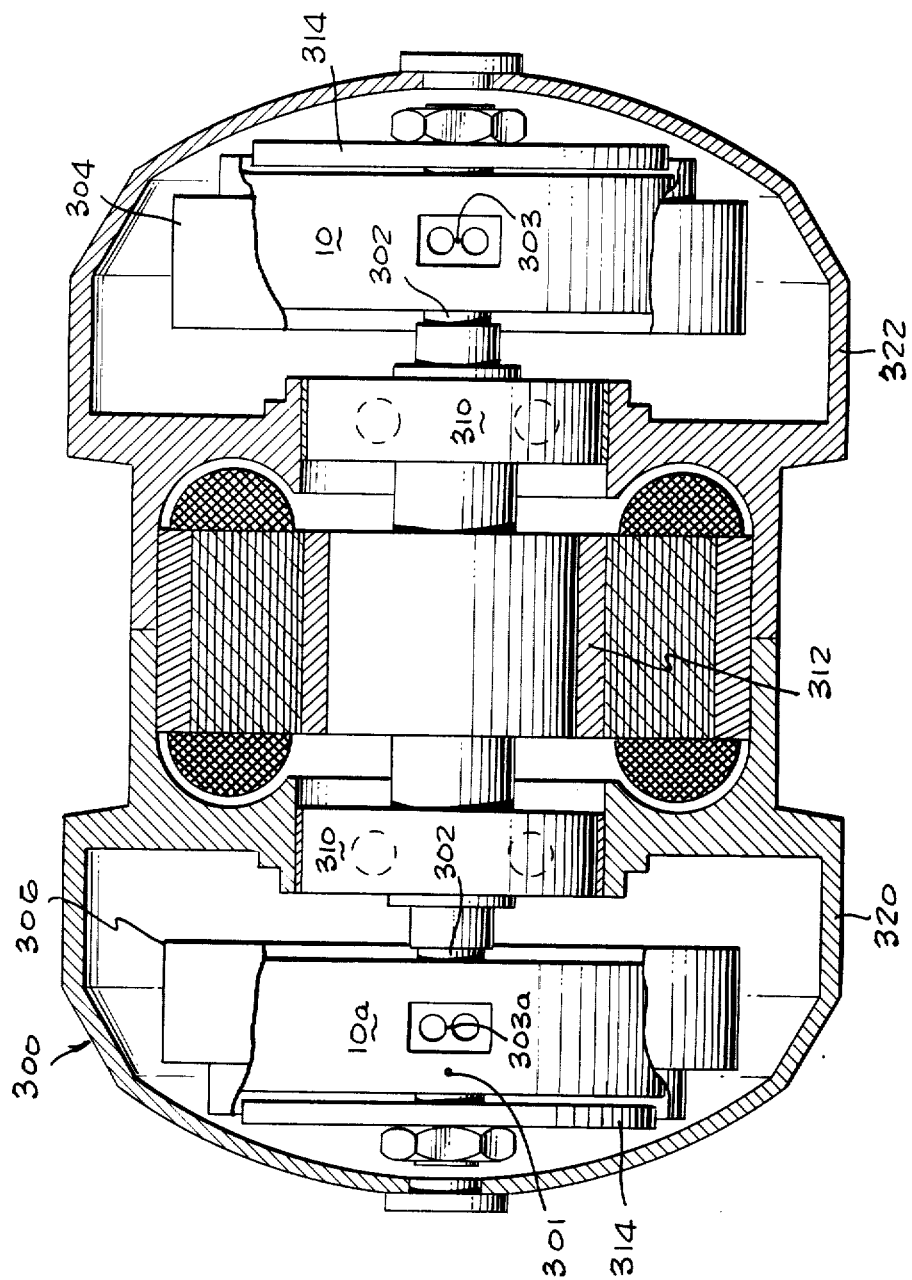

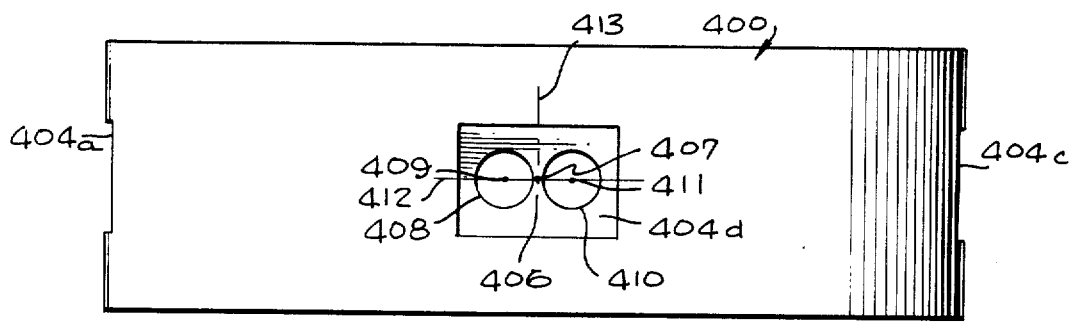
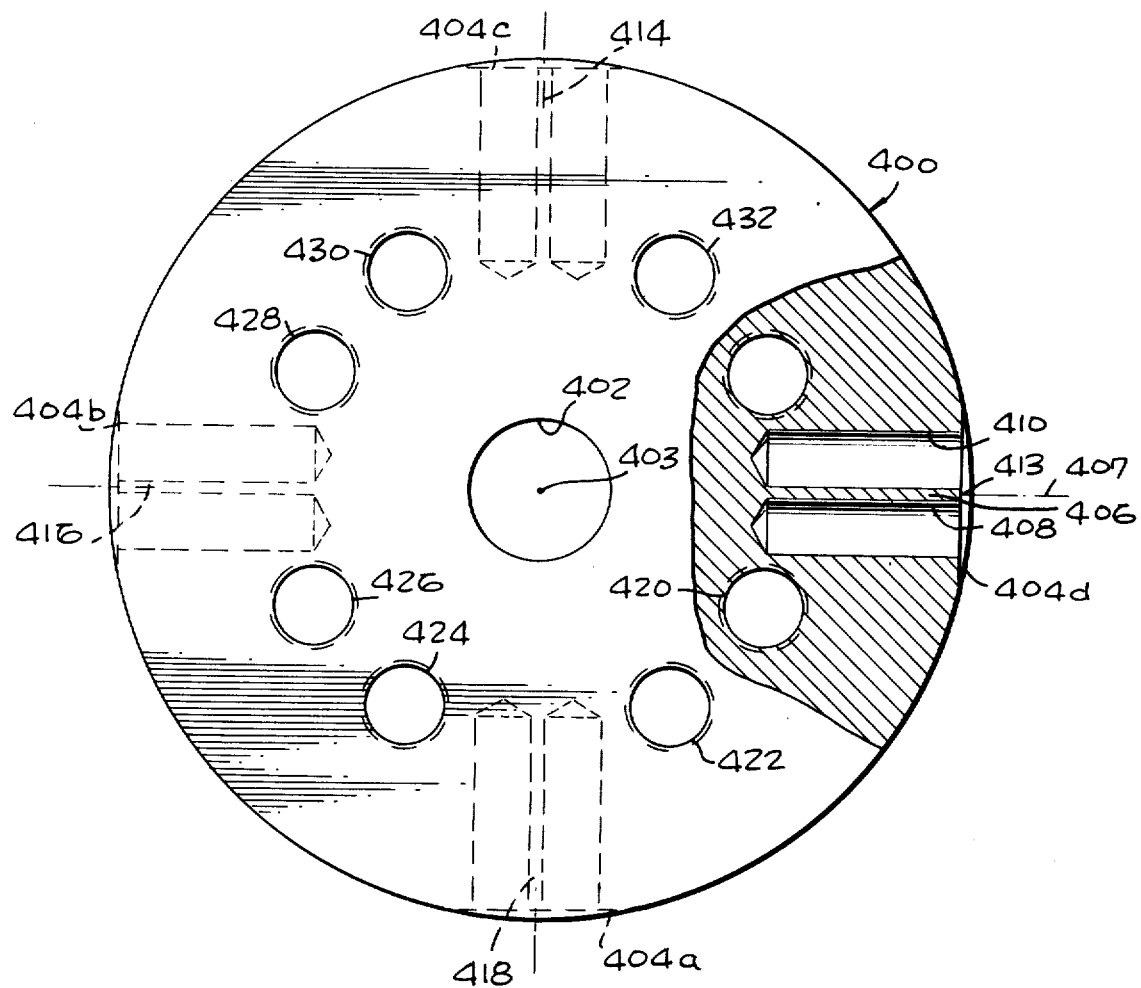

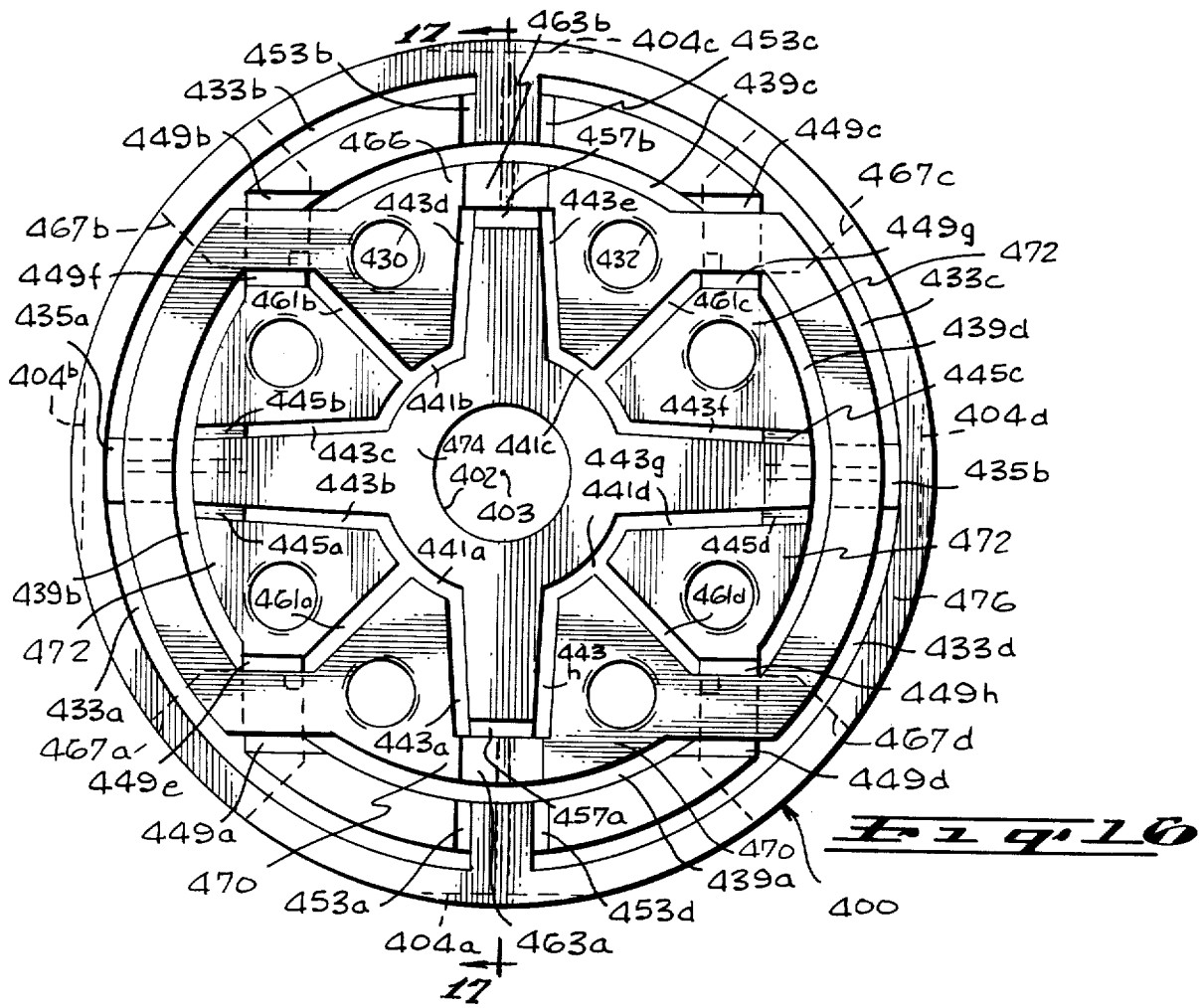
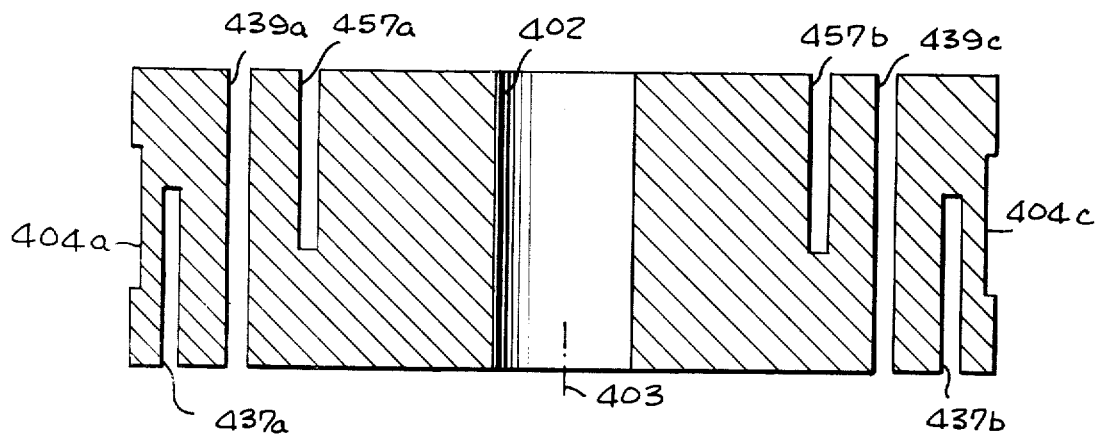

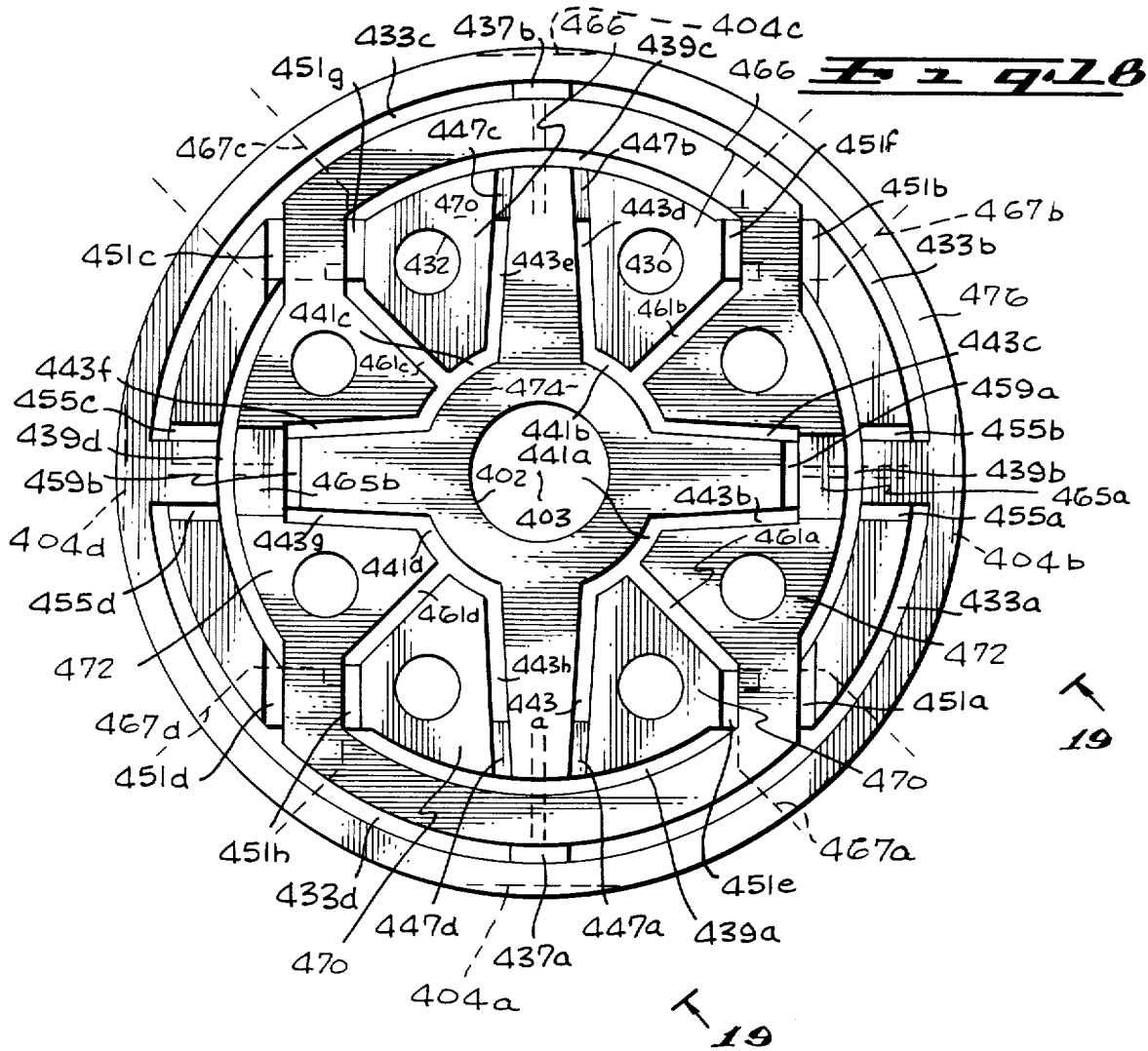
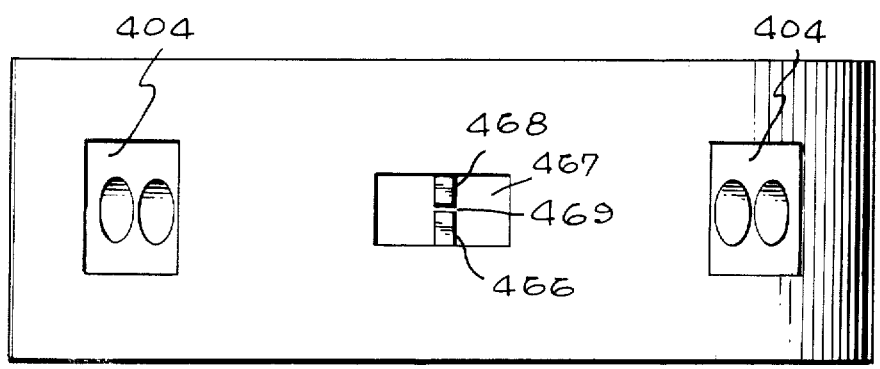

MULTIGIMBAL FLEXURE UNIVERSAL JOINT

BACKGROUND OF THE INVENTION

This invention relates to the art of fabricating universal joints, in particular, to the art of fabricating a means for suspending the rotor element of a gyroscope from a driving element or shaft.

One application for a universal joint for small angle deflections is found in the art of making free gyroscopes. A free gyroscope having a spinning rotor element may be mounted on a supporting structure so that the supporting structure can be turned or translated without applying disturbing torques to the rotor. In a practical device control torques are applied to the rotor element for processing the rotor element in a controlled manner. A free gyroscope customarily includes angular sensing devices for detecting angular misalignment between its rotor spin axis and either its shaft axis or a housing-fixed axis. The angular misalignment so detected may then be used, after appropriate amplification, to apply a torque to a supporting structure, such as a gimbal element of an inertial platform, to cause the supporting structure to follow the rotor spin axis thereby nulling the angular misalignment. Alternatively, a sensed angular misalignment may be utilized to apply a torque directly to the rotor element in what is known as "caged" or "captured" operation.

One of the ways a free gyroscope rotor element is maintained free is to support it by vibrating gimbal elements as disclosed in U.S. Pat. No. 3,678,764, issued July 25, 1972, and assigned to the same assignee as the present invention. The means for suspending the rotor element of that patent has separately fabricated gimbal elements and torsion bars with corresponding torsional axes angularly offset with respect to one another. U.S. Pat. No. 3,709,045 also discloses a two-piece suspension means with a pair of gimbal elements having corresponding torsional axes angularly offset from each other.

Other prior art patents teach the assembling, from separate pieces, of suspension means having a pair of gimbal elements in parallel alignment. Examples of patents teaching an inner hinge unit attached to an outer hinge unit are U.S. Pat. Nos. 3,354,726; 3,585,866; 3,614,894; 3,700,289; and 3,700,290. These prior art patents show two dissimilar gimbal elements attached to a shaft and to a rotor in a symmetrically parallel manner, i.e., the shaft-attached torsional axes of the gimbal elements aligned with respect to one another and the rotor attached torsional axes of the gimbal elements are aligned with respect to one another.

A flexure suspension having a single gimbal element is disclosed in U.S. Pat. No. 3,700,290.

Assembly of individual parts to form the flexure suspensions of the prior art requires extreme precision and adherence to close tolerances to fabricate a suspension unit having good performance characteristics. Misalignment of one or more axes of a flexure suspension used in a precision instrument such as a gyroscope will be a source of error in the performance of the gyroscope. Generally, assembly of the individual parts, for example by beam welding, brazing, etc. will cause some distortion to the parts during assembly and/or misalignment of the parts. For example, in flexure suspensions of the prior art it is difficult to achieve precisely a predetermined angle formed between corresponding flexure axes of multiple gimbal elements whether the angle is of zero degrees, of ninety degrees or has some other value. In addition, it is also difficult to achieve the desired result that each of the flexure axes of the gimbal elements precisely intersects all others at a common center point. Also, it is difficult to establish the center of gravity of a flexure suspension means precisely at the geometrical center of the suspension in both the radial and axial directions. Failure to achieve these alignments degrades performance characteristics and operating characteristics and degrades the accuracy of the instrument.

Additionally, the necessary precision alignment for a suspension formed or fabricated from separate parts requires extremely sophisticated fabricating and assembly equipment, and requires skilled personnel to perform the necessary alignment operations. Therefore it is desirable to fabricate a multigimbal flexure suspension from a single piece of material.

SUMMARY OF THE INVENTION

The above and other disadvantages of the universal joints and flexure suspension means of the prior art are overcome by providing a universal joint for small angle deflections which has a rotatable driving element connected to a driven element by at least two gimbal elements, and a plurality of flexure hinges, each gimbal element being connected between the driving element and the driven element by at least two flexure hinges, each flexure hinge having a flexure axis and a longitudinal axis. Each longitudinal axis of a flexure hinge is orthogonal to the flexure axis of the flexure hinge and also forms an angle of the same magnitude with respect to the axes of rotation of the driving and driven elements whenever these elements are in the null position, i.e., when their spin axes are colinear. In the preferred embodiment the longitudinal axes of the flexure hinges are parallel with respect to one another and with respect to the axes of rotation of the driving and driven elements when the universal joint is in a null position. Juxtaposed integral stops at each crossover of the gimbal elements limit the angular freedom of the driving element and the driven element with respect to one another and thereby reduce the likelihood of damage to the universal joint due to handling.

Such a universal joint may be precisely fabricated in one piece by a novel method including the steps of: forming in a blank a holding means for receiving a rotatable drive shaft; forming a predetermined number of pairs of parallel, adjacent apertures in the blank having a predetermined minimum spacing between one another, each aperture of said pair of adjacent apertures having a center axis which is equally offset from a radial flexure axis, each pair of adjacent apertures having a longitudinal axis therebetween which forms an angle of the same magnitude with respect to the axis of rotation as does the longitudinal axis of every other pair of parallel apertures, each pair of apertures having a predetermined angular spacing about the axis of rotation; removing material from the blank to form axial slots according to a predetermined pattern for a driving element, including said holding means, a driven element, at least a pair of gimbal elements and a plurality of flexure hinges; and removing material from the blank to form radial slots which separate the blank into a driving element, a driven element, and at least two gimbal elements, each gimbal element being connected to the drive element and to the driven element by flexure hinges.

In the preferred embodiment the centerlines of the plurality of apertures are copolanar and the flexure axes of the plurality of flexure hinges intersect at a common point on the axis of rotation of the driving element.

It is therefore an object of the invention to provide a new and improved one-piece universal joint.

It is another object of the invention to provide a universal joint that can be easily fabricated with a saving not only of time but also of cost.

It is also an object of the invention to provide a universal joint whose basic operating parameters are inherently optimized.

It is yet another specific object of the invention to provide a universal joint having at least two gimbal elements wherein the flexure axes of each gimbal element have a predetermined angular spacing with respect to a corresponding flexure axis of the other gimbal elements.

It is yet another object of the invention to provide a universal joint having substantially equal translational stiffness in both radial and axial directions.

It is a specific object of the invention to provide a universal joint having at least two gimbal elements with a center of gravity at the center of suspension of the universal joint.

It is another specific object of the invention to provide a universal joint having a plurality of flexure hinges wherein the longitudinal axis of each flexure hinge is substantially parallel to an axis of rotation of the universal joint when the universal joint is in the null position.

It is still another specific object of the invention to provide a universal joint having at least two gimbal elements suspended by a plurality of flexure hinges wherein the flexure axes of each gimbal element intersect one another at a common point.

It is a still further specific object of the invention to provide a rotatable universal joint having at least two gimbal elements wherein there is substantially no axial displacement between those end surfaces of the gimbal elements which are transverse to the axis of rotation and are displaced in the same direction from the center of suspension of the gimbal elements.

It is one more specific object of the invention to provide a universal joint having juxtaposed integral stops at each crossover of at least two gimbal elements for limiting angular freedom of the gimbal elements.

BRIEF DESCRIPTION OF THE DRAWINGS

FIG. 1 is a perspective view of one embodiment of a flexure suspension of the invention connecting a pair of gimbal elements to a driving element and to a driven element;

FIG. 3 is an exploded view of a first embodiment of the universal joint of the invention having a pair of gimbal elements;

FIG. 4 is a perspective view showing juxtaposed integral stops positioned at one crossover of a pair of gimbal elements;

FIG. 5 is a cross-sectional view of a gyroscope incorporating the first embodiment of a multigimbal flexure suspension of the invention;

FIGS. 11 and 12 are plan views of a second embodiment of the invention having three gimbal elements;

FIG. 13 is a cross-sectional view of a multisensor embodying the universal joint of the invention;

FIG. 14 is a plan view of one portion of a partially completed third embodiment of the invention and a partial sectional view of the remaining portion;

FIG. 15 is a side view of the third embodiment shown in FIG. 14;

FIG. 16 is a plan view of a first side of a completed third embodiment of the universal joint;

FIG. 17 is a cross-section taken on 17—17 in FIG. 16;

FIG. 18 is a plan view of a second side of a completed third embodiment of the universal joint;

FIG. 19 is a side view of the third embodiment shown in FIG. 16 taken on 19—19 in FIG. 18; and FIG. 20 is a side view of a portion of a fourth embodiment of the invention.

DESCRIPTION OF AN EMBODIMENT OF THE INVENTION HAVING TWO GIMBAL ELEMENTS

Figure 7:
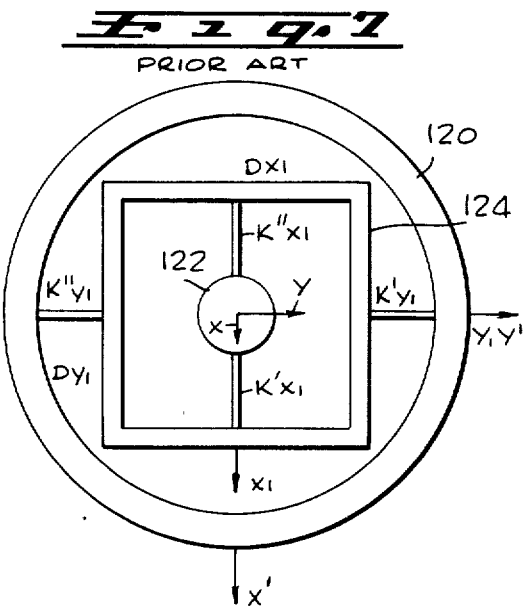
FIGS. 7, 8, 9 and 10 are diagrams used in describing the preferred operation of the universal joint of the invention.

In FIG. 1 there is shown a perspective view of one embodiment of the universal joint of the invention showing only the basic elements of a gyroscope. Universal joint 10 has a pair of gimbal elements with the center of gravity of the gimbal elements located at the center of suspension of the gimbal elements. Universal joint 10 comprises a driving element 12, having a drive axis of rotation 13, a driven rotor element 14, having a driven axis of rotation 15, and a suspension means comprising a pair of gimbal elements 18 and 20 having a center of suspension 19 and a plurality of flexure hinges. Rotor element 14 may have a substantially cylindrical shape. In the first embodiment driving element 12, rotor element 14, and gimbal elements 18 and 20 have end surfaces which are substantially coplanar. The end surfaces comprising one end of driving element 12, of rotor element 14, of gimbal element 18, and of gimbal element 20 are substantially coplanar in transverse plane 21 and the opposite end surfaces of each of these elements are substantially coplanar in transverse plane 23 when universal joint 10 is in a null position as defined below. When rotor element 14 is in a null position as shown in FIG. 1, rotor axis 15 is colinear with drive axis 13. Drive element 12 has a bore 22 for receiving a drive shaft.

The embodiment shown in FIG. 1 is fabricated according to the method which is described below for the fabrication of the preferred embodiment shown in FIGS. 14-19. According to the method slots are cut in a blank piece of material to form in one piece of material elements 12, 14, 78, 20 connected by a plurality of flexure hinges.

There is shown in FIG. 1 a flexure hinge 24 which is compliant in bending about a flexure axis but rigid about axes orthogonal to this flexure axis. The terms "compliant" and "compliance" as used herein mean the reciprocal of the spring rate of a flexure hinge. That is, gimbal elements 18 and 20 substantially isolate rotor element 14 from angular motions of driving element 12 about sensitive axes which are perpendicular to axis 13. The flexure axes described below are such sensitive perpendicular axes. Flexure hinges and their characteristics are described in an article entitled "How to Design Flexure Hinges" by J. M. Paros and L. Weisbord which was published in *Machine Design*, Nov. 25, 1965, pages 151 through 156. Although the flexure hinges taught herein are integral with gimbal elements, a driving element and a driven rotor element, it is to be expressly understood that such flexure hinges may be separately fabricated, as taught on the referenced article, and used to form the novel universal joint of the invention. However, such separate fabrication is not preferred.

The two-gimbal element embodiment shown in FIG. 1 includes a total of eight such flexure hinges for suspending rotor element 14 from driving element 12 by means of gimbal element 18 and gimbal element 20. Each gimbal is connected to driving element 12 by one pair of flexure hinges having colinear flexure axes and to rotor element 14 by another pair of flexure hinges having colinear flexure axes. In the first, second and third embodiments shown herein the longitudinal axes of the flexure hinges are substantially parallel with respect to one another and with respect to the axis of rotation of the driving element when the universal joint is in a null position. The null position is defined below in the description of FIG. 2.

Figure 2:
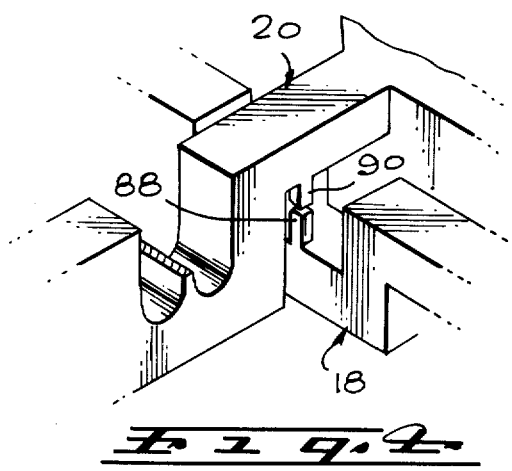
FIG. 2 is a side view of a portion of the embodiment of FIG. 1.

The geometry of flexure hinge 24 is shown in more detail in FIG. 2. The other elements shown in FIG. 1 are discussed below.

FIG. 2 is a side view of a cutaway portion of universal joint 10 showing flexure hinge 24 in a side elevation view. It should be observed that although FIG. 2 shows the apertures forming flexure hinge 24 and all the associated axes, flexure hinge 24 is itself not visible in this side view as hinge 24 is behind driven element 14. Flexure hinge 24 has a flexure axis 25 which radially extends from the rotor axis of rotation 15. Flexure hinge 24 is compliant about flexure axis 25. That is, it bends or flexes about this axis. Flexure hinge 24 also has a cross axis 26 and a longitudinal axis 27 which are both perpendicular to flexure axis 25. In the null position of universal joint 10 as illustrated in FIG. 2, the axis 27 is also parallel to drive axis 13 and to rotor axis 15. The null position is defined as the equilibrium position which exists in the absence of angular displacement between axes 13 and 15. Axes 13 and 15 are colinear only in the null position. In gyroscopic embodiments the null position would exist in response to the cessation of angular rate inputs about sensitive axes. The various embodiments are shown in the drawings as being in the null position.

The cross axis of the flexure hinge is perpendicular to the flexure axis and lies in a plane which is defined by the flexure axis and by any one of the infinite number of shortest lines from a point on one surface to a point on the other surface of the flexure hinge. In other words, such a line extends from a point on one surface of the flexure hinge 24 to a point on the other surface of the flexure hinge where the flexure hinge has a minimum thickness. Longitudinal axis 27 of flexure hinge 24 is perpendicular to flexure axis 25 and to the cross axis 26. It is to be understood that the term "longitudinal axis" of a flexure hinge as used herein for describing the first, second and third embodiments shown in FIGS. 1–19 means an axis which also satisfies the additional following condition. The longitudinal axis lies in a plane defined by the flexure axis of the flexure hinge and the colinear axes of rotation of the driving and driven elements. For example, in FIG. 2 longitudinal axis 27 is but one of the infinite number of lines lying in a plane defined by colinear axes of rotation 13 and 15 and flexure axis 25, and, in addition, longitudinal axis 27 extends parallel to axes 13 and 15, which, it will be recalled, are assumed at rest, and thus colinear, throughout the description of the structure.

Chordal slot 28 is a planar surface formed to facilitate forming apertures in the cylindrical surface of rotor element 14. Flexure hinge 24 is formed by a pair of apertures or bores which have centerlines or axes which are preferably coplanar with flexure axis 25 and which are substantially equally displaced from longitudinal axis 27. Aperture 30 is such a bore with a centerline 31 and a radius 33. Centerline 31 is displaced from longitudinal axis 27 by offset distance 35. Similarly, aperture 36 is a bore having a centerline 37 and a radius 39. Centerline 37 is offset from longitudinal axis 27 by an offset distance 41. Offset distance 41 is equal in magnitude but opposite in direction to offset distance 35. Thus the side elevation of flexure hinge 24 is a necked-down portion 42 having a minimum thickness 43. The necked-down portion 42 has a cross section which is symmetrical about longitudinal axis 27 and about cross axis 26. Flexure hinge 24 extends radially inwardly a distance which is a function of the desired spring rate and of the geometry of the design. The three-dimensional aspects of flexure hinge 24 and other features of universal joint 10 may be better understood by reference to FIG. 3 which is an exploded view of universal joint 10.

For purposes of illustration FIG. 3 depicts gimbal elements 18 and 20 axially displaced in opposite directions from the center of suspension 19 of driving element 12 and rotor element 14. Gimbal elements 18 and 20 are each attached by two flexure hinges to drive element 12 and by two flexure hinges to rotor element 14. In FIG. 3 the attachment between the gimbal elements and the driving element and the rotor element is shown broken at the flexure hinges. It must be understood that the drawing of FIG. 3 is primarily for understanding the structure of one embodiment of the invention. In reality gimbal elements 18 and 20 are physically interwoven and interconnected with the other elements so that they could not be separated as shown in FIG. 3. Gimbal elements 18 and 20 are preferably geometrically identical, oriented with one gimbal element being the mirror image of the other except rotated ninety degrees about axes 13 and 15 one with respect to the other. In other words, the end surfaces of gimbal element 18 which normally lie in transverse plane 21 are identical to but are rotated ninety degrees with respect to the end surfaces of gimbal element 20 which normally lie in transverse plane 23. (Transverse planes 21 and 23 are shown in FIGS. 1 and 2.)

Consider now the eight flexure hinges which rotatably connect rotor element 14 to gimbal elements 18 and 20 and gimbal elements 18 and 20 to driving element 12. Each of these eight flexure hinges comprise a necked-down portion between a pair of parallel apertures as discussed above with reference to FIG. 2. In FIG. 3 it can be seen that flexure hinge 24 extends radially inwardly behind chordal slot 28 and connects rotor element 14 to gimbal element 20. Flexure hinge 44 has a flexure axis 45 which is colinear with flexure axis 25 and orthogonal to axes 13 and 15. Flexure hinge 44 has a longitudinal axis 47 which is parallel to axes 13 and 15. Flexure hinges 24 and 44 have the same compliance characteristics and form a connection which may be described as a "rotor-attached" hinge connection for rotation of gimbal element 20 about colinear axes 25 and 45. For purposes of illustration axes 25, 27, 45 and 47 are shown for both the portion of flexure hinge 24 which is a part of rotor element 14 and for the other portion of flexure hinge 24 which is an integral part of gimbal element 20. Although each of the eight flexure hinges has a cross axis only cross axis 26 of flexure hinge 24 is shown in FIG. 3.

Gimbal element 20 is connected to driving element 12 by a pair of flexure hinges which have colinear flexure axes and parallel longitudinal axes. The colinear flexure axes of the pair of hinges connecting gimbal element 20 to drive element 12 are angularly offset about drive axes 13 and 15 from colinear axes 25 and 45. More particularly, flexure hinge 48 has a flexure axis 49 and a longitudinal axis 51. Flexure hinge 52 has a flexure axis 53 which is colinear with flexure axis 49 and has a longitudinal axis 55 which is parallel to longitudinal axes 51, 27 and 47 and to axes 13 and 15. Axes 49 and 53 are orthogonal to axes 25 and 45. Flexure hinges 48 and 52 have the same compliance characteristics and form a connection which may be described as a "shaft-attached" compliant hinge connection for rotation of gimbal element 20 about colinear axes 49 and 53.

By design the center of gravity of gimbal element 20 lies at the common intersection 19 of flexure axes 25, 45, 49 and 53. In this embodiment the intersection of the flexure axes of gimbal element 20 and the center of gravity of gimbal element 20 is achieved by design of a symmetrical form having its mass equally divided on either side of a plane defined by the flexure axes 25, 45, 49 and 53.

Gimbal element 18 is similarly connected to rotor element 14 by a pair of colinear flexure hinges 56 and 60 and to driving element 12 by a second pair of colinear flexure hinges 64 and 68.

Flexure hinge 56 (having a flexure axis 57 and a longitudinal axis 59) is one of two hinges connecting gimbal element 18 to rotor element 14. Flexure hinge 60 (having a flexure axis 61 and a longitudinal axis 63) is the other flexure hinge connecting gimbal element 18 to rotor elment 14. Flexure axes 57 and 61 are colinear. Flexure hinges 56 and 60 form a rotor-attached hinge connection for rotation of gimbal element 18 about coaxial axes 57 and 61.

Flexure hinge 64 (having a flexure axis 65 and a longitudinal axis 67) and flexure hinge 68 (having a flexure axis 69 and a longitudinal axis 71) are the colinear flexure hinges connecting gimbal element 18 to drive element 12. Flexure axes 65 and 69 are colinear and angularly offset by ninety degrees about axes 13 and 15 with respect to colinear flexure axes 57 and 61. Longitudinal axes 59, 63, 67 and 71 are parallel one with respect to another, they are parallel with respect to the longitudinal axes of the flexure hinges of gimbal element 20, and they are parallel with respect to axes 13 and 15.

Flexure axes 25 and 45 are colinear with flexure axes 65 and 69. Similarly flexure axes 57 and 61 are colinear with flexure axes 49 and 53.

The center of gravity of gimbal element 18 lies at the common intersection 19 of flexure axes 57, 61, 65 and 69. Gimbal element 18 is designed to be identical to gimbal element 20 and therefore has substantially the same mass distribution as gimbal element 20.

In addition, flexure axes 25, 45, 49, 53, 57, 61, 65 and 69 all intersect drive axis of rotation 13 and rotor axis of rotation 15 at a common point 19, thus establishing a system of three mutually orthogonal coordinate axes.

The coaxial flexure axes of each flexure hinge connection of each gimbal element are orthogonal to the corresponding axes of the hinge connection of the other gimbal element. Colinear axes 25 and 45 of gimbal element 20 are orthogonal to colinear axes 57 and 61 of gimbal element 18. Colinear axes 49 and 53 of gimbal element 20 are orthogonal to colinear axes 65 and 69 of gimbal element 18.

Also shown in FIG. 3 are eight threaded apertures 72, 74, 76, 78, 80, 82, 84 and 86. Four of these apertures are located in gimbal element 18 and the other four in gimbal element 20. Each of these apertures contains an associated one of eight adjustable balance weights 73, 75, 77, 79, 81, 83, 85 and 87. The use of the balance weights is discussed in detail below.

In FIG. 3 there are shown two juxtaposed stops 88 and 90 which are integral with gimbal elements 18 and 20 respectively. There are a total of four pairs of juxtaposed integral stops which limit the freedom of angular displacement of rotor element 14 relative to driving element 12. Not all of these integral stops are visible in the perspective of FIG. 3. In other words, the integral stops limit deflection about the flexure axes of the universal joint. The primary purpose of the integral stops is to prevent damage to the universal joint during fabrication. At each crossover of gimbal elements 18 and 20 there is a pair of juxtaposed integral stops, one on one gimbal element and one on the other gimbal element as shown in detail in FIG. 4. When the rotor flexes to a predetermined angle, the stops butt against one another thereby preventing excessive deflection about a flexure axis. There is a gap between each pair of juxtaposed integral stops sufficient to permit a deflection in the order of 20 to 30 milliradians about a corresponding flexure axis of the hinge. The stops will not limit deflection of the rotor element 14 when it is spinning because in the conventional manner of operating a gyroscope the spin axis of the rotor element is maintained in alignment with the spin axis of the driving element by a servo control means (not shown). The integral stops each have the general shape of a tooth which would touch the opposite tooth if an excessive angle of rotor deflection angle were reached. In a gyroscope having a universal joint with such integral stops another well-known means would be utilized to limit deflection about the flexure axes before the integral stops abut one another. For example, a conventional stop plate may be used to prevent the integral stops from gnawing on one another and to prevent excessive deflection of the rotor element during operation of the gyroscope. Fabrication of the integral stops is discussed below.

Referring now to both FIG. 1 and FIG. 5, there is shown in FIG. 5 a cross section of a free-rotor flexure-suspended gyroscope similar to the one described in U.S. Pat. No. 3,678,764 except that universal joint 10 has been substituted for the suspension means of this prior art gyroscope. The gyroscope shown in FIG. 5 includes a drive shaft 104, a universal joint 10, and an inertial wheel 106. The universal joint 10 interconnects drive shaft 104 and inertial wheel 106. Inertial wheel 106 may be bonded to rotor element 14.

The operating principle of the gyroscope is based on angular decoupling of a spinning gyro rotor such as inertial wheel 106 from a driving shaft 104. To understand this concept consider the connection between the wheel and shaft to be a frictionless universal joint. In such a universal joint there would be minimal restraint to angular motion between the wheel and shaft. In addition such a universal joint provides high resistance to translational motion parallel and perpendicular to the spin axis.

When the moment of inertia of each of the gimbal elements is adjusted in accordance with a tuning equation, the spinning rotor is free to deflect through small angles without experiencing reaction torques. Thus a substantially frictionless universal joint is achieved. This concept is explained in more detail below and in U.S. Pat. No. 3,678,764. The dry, i.e. fluidless, tuned rotor feature eliminates all of the disadvantages of pigtail power leads, mass instability, radiation sensitivity, fluid stratification, gimbal pivots, etc. which are common to fluid-filled gyroscopes.

In FIG. 1 it can be seen that the inertial wheel 106 is attached to rotor element 14 which is in turn attached by flexures to the two gimbal elements 18 and 20. Gimbal elements 18 and 20 are attached to the drive element 12 with flexure hinges. The inertial wheel 106 and universal joint 10 comprise the entire sensitive element. As shown in FIG. 5, the shaft 104 may be supported by a housing or case 108 with a pair of preloaded ball bearings 110. Ball bearings in this instrument are not part of the sensitive element and therefore have no influence on mass imbalance of the inertial wheel 106.

Capacitance pickoffs comprising a plurality of plates 112, in cooperation with flange 113 of inertial wheel 106, form four capacitor pairs for sensing angular motion of the gyro housing relative to the rotor element. The pickoff signals may then be nulled by torquers as described below and servo loops (not shown) and thereby providing two axes of inertial stabilization or angular rate measurements. The four capacitance pickoffs are equiangularly spaced around the flange 113 (only one pickoff being shown in FIG. 5).

A means for applying eddy current torque to the inertial wheel 106 is shown in FIG. 5. A second conductive flange 114 is positioned around and at the other side of inertial wheel 106. Flange 114 fits into the gaps of four circumferentially symmetrically disposed electromagnets 115a, 115b, 115c, and 115d (only magnet 115d is shown in FIG. 5). Each of the electromagnets has an electric coil which is connected to be controlled by — for example — control means such as computers or servo means (not shown). The coils of the electromagnets are 116a, 116b, 116c and 116d (two of which are shown in FIG. 5). The electromagnets are supported on a bracket attached to housing 108. When it is desired to apply a torque to inertial wheel flange 114 about an axis (not shown) passing through magnets 115a and 115c, magnets 115a and 115c are energized. The eddy currents induced in flange 114 react with the flux field to produce this torque. When it is desired to apply a torque to flange 114 about an axis (not shown) passing through the center of magnets 115b and 115d, magnets 115b and 115d are energized.

Isolation from external magnetic fields is provided by housing 108 which may be made of a high permeability steel.

The spin motor may be a three-phase hysteresis synchronous motor to drive the shaft 104, universal joint 10, and inertial wheel 106 at a desired speed. The spin motor comprises stator windings 117, hysteresis ring 118, and web 119.

Consider now the operation of the universal joint of the invention. An understanding of its operation may be facilitated by reference to a theoretically ideal tuned rotor element of a gyroscope.

Figure 6:
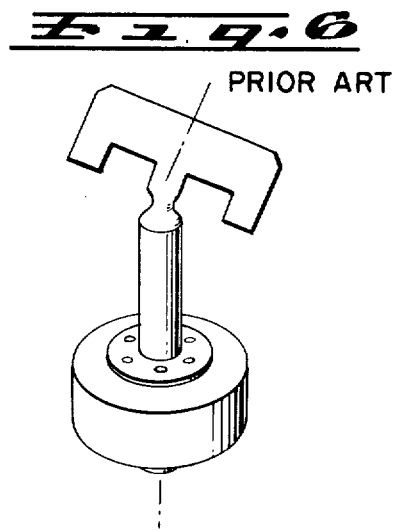
FIG. 6 is a perspective view of the basic elements of an ideal gyroscope theorized in the prior art.

An idealized gyroscope that demonstrates the general concept could be a rotor element spinning in a vacuum and attached to a shaft through an infinitely compliant joint comprising a necked-down section of the shaft as shown in FIG. 6. Such a joint is to be considered as being infinitely weak in bending. Since the necked-down shaft is considered to be infinitely compliant it cannot exert any torques on the rotor; and if the center of gravity of the rotor element lies at the center of support of the joint, there cannot be any torques on the rotor due to acceleration or vibration. Assuming the rotor element could be operated in a vacuum and completely magnetically shielded, no other source of torque would exist. Thus the rotor element would be free to spin undisturbed and would not drift. That is, the rotor axis would remain fixed with respect to inertial space. The ideal gyroscope would have zero spring rates. For example, if the rotor element of a perfect two-axis tuned-rotor gyroscope were displaced angularly from the spin axis of its drive shaft, the rotor element would continue to spin at its new position with no tendency to realign itself to the shaft axis of rotation.

Approximation of this ideal gyroscope in actual practice presents several problems. One goal is to provide a substantially infinitely compliant joint that is also strong enough to support a rotor against linear accelerations. Assume the necked-down shaft of the ideal gyroscope is first replaced with a one-piece universal joint having at least a pair of gimbals, as shown in FIGS. 1 and 5: This would give the rotor element complete angular freedom while supporting it against acceleration. To avoid uncertainties in error torques, the pivot means in the universal joints must be substantially frictionless. Such pivots are achieved by using elastic flexure hinges in torsion rather than conventional bearings. However, the practical instrument may exhibit error torques which would cause a rotor previously displaced from the shaft axis of rotation to realign itself with the shaft axis.

One such undesired error torque would arise if the direction of the spin axes of the rotor element and of the drive shaft do not coincide when the gyroscope is in a captured condition. Such a misalignment would occur, for example, if there were an offset in the pickoffs used to detect the position of the spin axis. Assuming the absence of other sources of torque on the rotor, an offset in the pickoffs of a captured gyroscope would result in a bending of the flexure hinges. Bending of the flexure hinges would, in turn, produce a torque on the rotor element, tending to align the rotor element with the drive shaft. Since the rotor element has angular momentum, this torque would produce the well-known effect of precessing the spin axis of the rotor element around in a cone. This torque developed by the bending hinges is known as an in-phase spring rate.

If the spin axis of the rotor element and of the drive shaft are not aligned, each gimbal element must vibrate back and forth to accommodate the relative motion. Since a gimbal element has a finite mass and moment of inertia, it must be acted on by torques to produce this motion, and these torques are produced partly by reactions on the drive shaft and partly by reactions on the rotor element. The reaction torques on the rotor element provide a compensating mechanism. Mathematically these torques of the gimbal elements are identical to a negative in-phase spring rate. They may be adjusted to make the rotor element precess in a cone but in the opposite direction to the precession produced by the bending action of the flexure hinges. Adjustment of gimbal negative spring rates to cancel the torsional positive spring rates at a particular spin speed of the rotor is known as "tuning" the gyroscope. The conditions of tuning a free-rotor gyro having a single intermediate gimbal suspended between a rotor and a shaft are described in an article entitled "Dynamically Tuned Free Rotor Gyroscope" published in *Control Engineering*, June, 1964, pages 67 through 72.

The stiffness of this negative spring is determined by the moment of inertia of the gimbal elements. The general torque expression is given by the stiffness of the negative spring:

$$\text{dynamic spring rate for each gimbal} = N^2 (C-A-B)$$

where $N$ = spin frequency and $A$, $B$ and $C$ are gimbal principal moments of inertia about the spin axis and about the flexure axes. The strength of the effective spring rate is proportional to the moment of inertia of the gimbal element about the spin axis minus the moments of inertia about the two flexure axes. If the gimbal element were infinitely thin, this expression would approach zero; the negative spring rate is proportional to the height of the gimbal element in the direction of the spin axis. In practice the positive spring rates of the individual flexure hinges are preferably matched to one another within an accuracy of about five percent, and the effective height of each gimbal element is adjusted by means of adjustment screws so that the total spring rate is substantially zero.

For a gyro in the free mode (no capturing) a direct or in-phase net spring rate causes nutation of the rotor (a slow coning motion) directly proportional to the extent the rotor axis is offset from the spin axis. For example, a direct spring rate arises if the spin frequency is different from the tuned frequency of the gimbal suspension, i.e. if the suspension is not perfectly tuned. Torque is developed about the same axis as the initial displacement, which in turn causes the rotor to precess about an axis at right angles to the displacement axis. Since there is no energy dissipation in this spring, the rotor axis of spin does not return to the shaft axis of spin but continues to precess in a cone about the shaft axis.

The magnitude of the in-phase spring rate for off-tuning conditions is $$\dot{\theta}/\theta = (\Delta N)/F_m$$

where $\Delta N$ is the difference between the tuned frequency and the actual spin frequency and $F_m$ is a term called the figure of merit. $F_m$ for any given instrument is equal to $HN/K_T$, where $H$ is the angular momentum of the rotor, $N$ is the spin frequency, and $K_T$ is the sum of all the torsional spring rates of the hinge suspension.

A net in-phase spring rate due to off-tuning is eliminated by adjusting the moments of inertia of the gimbal elements in the manner taught below. The universal joint of the invention may be implemented in a gyroscope which substantially eliminates error torques arising because of the rectification of vibrations occurring at a frequency equal to twice the spin frequency of a rotor element. Such rectified error torques may also be substantially eliminated by adjustment of the moments of inertia of the gimbal elements. Ball bearings utilized to support the shaft produce vibrations at harmonics of the spin frequency. Unless compensatory adjustments are made, tunedrotor gyros will rectify such vibrations at twice the spin frequency. The effect can be severe, typically of the order of 5°/hr/sec of amplitude of the vibration at a frequency of twice the spin frequency if no compensation is made.

To understand this effect more fully, consider an example where the flexure hinges along one axis of a gimbal element are relatively stiff compared to hinges along the other axis of the gimbal element. If the gyro is subjected to angular vibration, the hinges must twist by an amount equal to the amplitude of the vibration, thus producing a direct spring torque on the rotor element. Normally these spring torques will average to zero over each cycle of vibration, but not in the case of synchronous vibration at twice the spin frequency 2N. In the worst case the positive half-cycles of angular displacement will twist a stiff flexure hinge while the negative half-cycles will twist a weak, i.e. a less stiff, flexure hinge. The result is a net average torque on the rotor element. For actual flexure hinges this effect can be practically eliminated by careful matching of the spring rates of the flexure hinges.

However, the negative dynamic spring rate produced by the motion of the gimbal inertias is highly asymmetrical. To explain this phenomenon more fully, assume that an angular rate is applied about an axis fixed with respect to the housing of the instrument. The torque transmitted to the rotor element at any given instant is a function of the position of the rotor element at that instant. For a single gimbal element it can be seen that the gimbal element is coerced to follow the shaft angular rate when the shaft-attached flexure axis is at right angles to the axis of the input rate, but is not coerced to follow the shaft when it is in line with the axis of the input rate (because of its low torsional stiffness). Essentially, then, the rotor element is alternately torqued with high gyroscopic torques when the input angular rate acts across the "hard" axis of the gimbal but is not torqued with high gyroscopic torques when the input angular rate acts on the "soft" axis. If a condition can be met such that the high angular rates in one direction occur when there is strong gyroscopic coupling to the rotor, but for the high angular rates in the opposite direction the transmitted torques are very weak, then there will be a net rectification in favor of the high coupling direction. This condition does exist for angular vibration inputs at twice the spin frequency and only at this frequency. Analysis has shown, however, that this rectification effect is canceled by the torques applied to the rotor element by a properly matched second gimbal element attached at right angles to the first, or by second and third gimbal elements equiangularly spaced around the spin axis from the first gimbal element and matched to effectively cancel the torque vectors of the three gimbal elements, and so forth for universal joints having four or five gimbal elements.

The universal joint of the invention preferably includes at least two independent gimbal elements having their gimbal inertias adjusted to achieve cancellation of the spring rates and cancellation of torques due to vibrations about casefixed input axes at twice the spin speed. For example, the gimbal elements will rectify 2N vibration, but the rectification torques will be equal and opposite, provided that the gimbals are carefully matched for this characteristic. The matching is accomplished with the same balance weights used to tune the gyro to zero net spring rate at the operating frequency.

The following paragraphs restate the teachings of U.S. Pat. No. 3,678,764 and describe the equations of motion of such a gyroscope, the tuning conditions, and the conditions for substantial suppression of errors caused by applied torques at frequency 2N.

Figure 8:
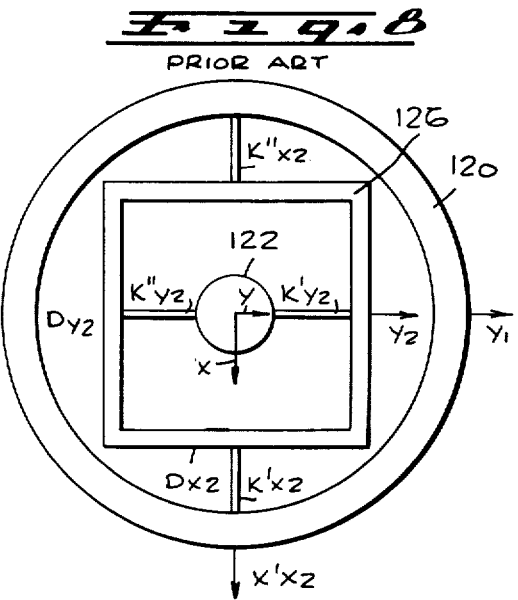

In FIG. 7 is shown a simplified diagram of the rotor 120, the shaft 122 and the gimbal element 124 with coordinates adapted for ease of analysis and simplicity of the equations. Similarly, FIG. 8 is a simplified diagram of the rotor 120, shaft 122 and another gimbal element 126 having coordinates which simplify the analysis and which result in simplified equations. The coordinate axes are defined as follows:

A right-hand set of orthogonal coordinate axes X, Y, Z are defined upon the supporting housing (not shown in FIGS. 7 and 8).

The rotatable shaft 122 has affixed therein a right-hand set of orthogonal coordinate axes $x, y, z$ in which the coordinate z coincides with the coordinate Z of the housing-fixed set of coordinates X, Y, Z. The $x, y$ coordinates rotate with the shaft 122 and define a plane which is at right angles to the driving shaft axis z.

A right-hand orthogonal set of coordinates $x_1, y_1, z_1$ is defined in the gimbal element 124 with the $x_1$ axis coinciding with the $x$ axis of the shaft 122, as shown particularly in FIG. 7.

A right-hand orthogonal set of coordinates $x_2, y_2, z_2$ is defined in the gimbal element 126 as shown particularly in FIG. 8, with the $y_2$ axis coaxial with the y axis of the shaft 122.

A right-hand orthogonal system of coordinates $x', y', z'$, as shown particularly in FIGS. 7 and 8, is defined on the rotor 120 with the $x'$ axis coaxial with the $x_2$ axis. The $y'$ axis is coaxial with the $y_1$ axis.

The torsional spring constants of the springs connecting the shaft 122 and the gimbal 124 along the $x, x_1$ axes are designated $K_{x1}'$ and $K_{x1}''$. The spring constants of the springs connecting the shaft 122 and the gimbal 126 along the $y_2, y$ axes are designated $K_{y2}'$ and $K_{y2}''$. The spring constants of the springs connecting the gimbal 124 to the rotor 120 along the $y_1$ axis are designated $K_{y1}'$ and $K_{y1}''$. The spring constants of the springs connecting the gimbal element 126 and the rotor 120 along the $x_2$ axis are designated $K_{x2}'$ and $K_{x2}''$.

In the following equations $K_x$ is the total positive spring rate which acts along the $x$ axes and $K_y$ is the total positive spring rate which acts along the $y$ axes:

$$K_x = K_{x1}' + K_{x1}'' + K_{x2}' + K_{x2}''$$

$$K_y = K_{y1}' + K_{y1}'' + K_{y2}' + K_{y2}'' \quad (1)$$

The damping coefficient $D_{x1}$ is defined for gimbal element 124 for its rotation about the $x_1$ axis. The damping coefficient $D_{y1}$ is defined for gimbal element 124 for its rotation about the $y_1$ axis. Similarly, the damping coefficients $D_{x2}$ and $D_{y2}$ are defined for gimbal element 126 for its rotation about the $x_2$ and the $y_2$ axes, respectively. In the following equations, it is assumed that the damping coefficients are zero. The effect of a damping coefficient is to shorten the time constant of the device. Hence the value of the damping coefficient must be maintained small enough that it does not affect the operation of the device.

The principal moments of inertia for gimbal element 124 are defined as $A_1, B_1, C_1$ about the $x_1, y_1, z_1$ axes, respectively. The principal moments of inertia for gimbal element 126 are defined as $B_2, A_2, C_2$ about the $x_2, y_2, z_2$ axes, respectively. Because of the symmetry of the gimbal elements 124 and 126 and of the rotor 120, the products of inertia are zero.

The principal moments of inertia for rotor 120 are defined as A, B, C about the $x', y', z'$ axes, respectively.

Figure 9:
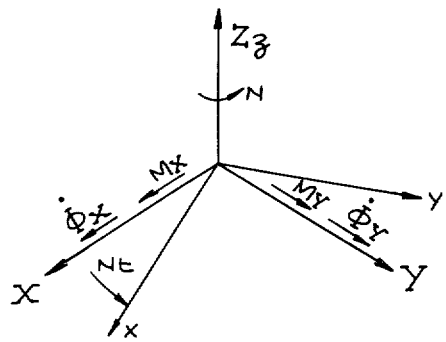
Figure 10:
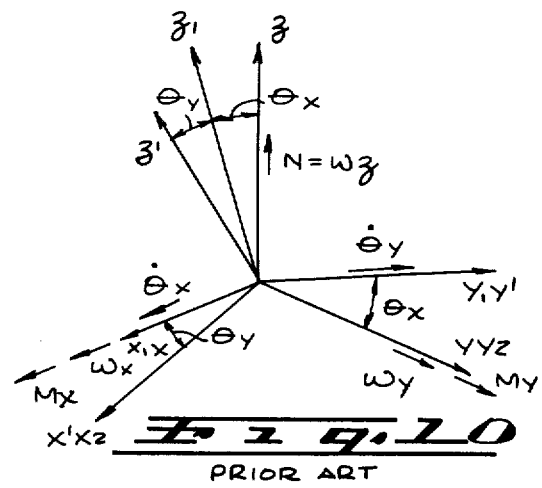

FIGS. 9 and 10 are diagrams showing the relationship between the housing or case-fixed coordinates X, Y, Z and the rotor-fixed coordinates $x, y, z$ for the purpose of explaining the resolution of angles, angular rates and torques which are applied about the case-fixed axes X, Y into the rotor-fixed axes coordinate system $x, y, z$. The angular velocity of the shaft is defined as "N." Angular rates applied to the housing or case perpendicular to the Z axis may be resolved into components $\dot\phi_x$ and $\dot\phi_y$ about the case-fixed axes X and Y, respectively. The angular rates $\dot\phi_x$ and $\dot\phi_y$ may then be resolved into angular rates about the shaft-fixed axes $x, y, z$. Similarly, torque acting on the gimbals (or rotor) from the housing or case about an axis perpendicular to the Z axis may be resolved into components $M_X$ and $M_Y$ about the X and Y axes, respectively. The $M_X$ and $M_Y$ components may be resolved about the shaft-fixed axes $x$ and $y$.

The spin axis $z'$ of the rotor 120 is, in general, not constrained to be coaxial with the axes $z$ and Z. The rotor 120 may be considered to be angularly displaced, relative to shaft 122, about the $x$ and $y$ axes. The angular displacements of the rotor 120, relative to the shaft 122, about the $x$ and $y$ axes of the shaft 122, are designated $\theta_x$ and $\theta_y$, respectively.

For the above definitions, the equations of motion of the rotor 120 relative to the shaft 122 are:

$$(A + A_1)\ddot\theta_x + [K_x + N^2(C + C_1 - B - B_1)]\theta_x +$$
$$N(C - A - B)\dot\theta_y = -(A + A_1)[\dot\phi_x \cos Nt + \dot\phi_y \sin Nt] +$$
$$N(C + C_1 + A - B + A_1 - B_1)[\dot\phi_x \sin Nt - \dot\phi_y \cos Nt] +$$
$$M_X \cos Nt + M_Y \sin Nt$$

and $$(B + A_2)\ddot\theta_y + [K_y + N^2(C + C_2 - A - B_2)]\theta_y -$$
$$N(C - A - B)\dot\theta_x = +(B + A_2)[\dot\phi_x \sin Nt - \dot\phi_y \cos Nt] +$$
$$N(C + C_2 + B - A + A_2 - B_2)[\dot\phi_x \cos Nt + \dot\phi_y \sin Nt] -$$
$$M_X \sin Nt + M_Y \cos Nt$$

It can be shown from these equations that if the torsional spring rates are adjusted, and the moments of inertia are adjusted, the rotor acts substantially as a free rotor, while eliminating rectification torques from the rotor caused by oscillatory inputs on the shaft at twice the spin frequency N. The general conditions for such adjustments are:

$$\Delta J = \frac{-\Delta K[J + (A + B - C)]}{K - N^2(A + B - C)} \quad (3)$$

for rectification suppression, and $$J = \frac{K}{N^2}-(A+B-C)+(A+B-C)\left(1+\frac{(\Delta K+N^2 \Delta J)^2}{N^4(A+B-C)^2}\right)^{1/2} \quad (4)$$

for perfect tuning; where;

$$J = \tfrac{1}{2}[A_2 + B_2 - C_2) + (A_1 + B_1 - C_1)] \quad (5)$$

$$\Delta J = \tfrac{1}{2}[(A_2 + B_2 - C_2) - (A_1 + B_1 - C_1)] \quad (6)$$

$$K = \tfrac{1}{2}[K_x + K_y] \quad (7)$$

$$\Delta K = \tfrac{1}{2}[K_x - K_y] \quad (8)$$

and N equals angular velocity of shaft 122 in radians/second.

For a practical instrument, $$\Delta K/K \ll 1 \text{ and } (A+B-C) \gg J \quad (9)$$

Therefore equations (3) and (4), to a close approximation, reduce to:

$$\Delta J \cong \Delta K/N^2 \quad (10)$$

and $$J \cong K/N^2 \quad (11)$$

Rearranging equations (10) and (11) and substituting equations (5), (6), (7) and (8), $$(K_x - K_y) \approx N^2 (A_2 + B_2 - C_2 - A_1 - B_1 + C_1) \quad (12)$$

for 2N rectification suppression, and $$(K_x + K_y) \cong N^2 (A_1 + A_2 + B_1 + B_2 - C_1 - C_2) \quad (13)$$

Note by adding equations (12) and (13)

$$K_x = N^2 (A_2 + B_2 - C_2) \quad (14)$$

and by subtracting equation (12) and (13)

$$K_y = N^2 (A_1 + B_1 - C_1) \quad (15)$$

Thus, for a given set of springs having composite spring constants $K_x$ and $K_y$ as defined in equation (1), it is possible to adjust the gimbal inertias by balance weights to achieve the desired conditions of both proper tuning and also zero 2N rectification.

In applying the foregoing analysis to a practical embodiment rotor 120 may be considered to be the dynamic equivalent of rotor element 14 and inertial wheel 106. Similarly, shaft 122 may be considered to be the dynamic equivalent of drive element 12 and shaft 104.

There are a number of parameters considered in the design of the two gimbal embodiment of the universal joint of the invention shown in FIGS. 1–5. For purposes of discussion these design parameters may be grouped in terms of design choices, inertia characteristics of the multiple gimbals, stiffness of the flexure hinges connecting gimbal elements to the rotor element and to the drive element, and the geometry of the suspension system of gimbals and flexure hinges.

One of the initial design choices to be made is the selection of a material from which the one-piece universal joint is to be made. The material selected should have a low hysteresis. Utilization of a material having low hysteresis will contribute to the minimization of damping caused by oscillations about the torsion axes.

Another primary design choice in the fabrication of a gyroscope utilizing the universal joint of the invention is the selection of a spin speed for gyro motor, shaft, inertial wheel and universal joint. Selection of a spin speed is related to specific designs for these rotating elements of a gyroscope and is not a part of the invention. For purposes of the following discussion, it will be assumed that an appropriate spin speed of the gyro has been selected.

It will also be assumed that the inertial wheel has no (or can be adjusted to substantially eliminate) mass unbalance and radial unbalance.

There are two interrelated design parameters which should be considered in order to achieve a tuned condition (i.e. cancellation of the spring rates of the suspension system) and to achieve cancellation of constant torques acting on the rotor generated by rectification of vibrations of the shaft occurring at substantially twice the spin frequency. The conditions for achieving both proper tuning and also zero 2N rectification are set forth in equations (14) and (15) above. Satisfaction of the conditions of equations (14) and (15) is achieved by adjusting balance weights which vary the moments of inertia of the gimbal elements. Selection of the same moments of inertia of the gimbal elements and torsional stiffness for the flexure axes minimizes the range of balance adjustment needed to achieve the two conditions.

According to another design parameter, radial and axial stiffness of the universal joint 10 are preferably approximately equal. Anisoelasticity of the suspension (i.e. substantially unequal stiffness) in the radial and axial directions will generate a torque on the rotor if accelerations act along both the spin axis and input axes simultaneously. For example, isoelasticity of the suspension means may be achieved by making the U-shaped sections of gimbal elements 18 and 20, as shown in FIG. 3, the appropriate thickness so that axial compliance is equal to radial compliance.

According to the next design parameter, the center of gravity of the gimbal elements is preferably at the center of suspension of the universal joint in both the axial and radial directions. If this condition is not met, the universal joint will contribute to spin axis mass unbalance and to radial unbalance of the combined universal joint and inertial wheel system. Recall that it was assumed that the inertial wheel is balanced in both the radial and axial directions. Ease in achieving this design parameter is one of the significant advantages of the universal joint of the invention. Because the universal joint of the invention is fabricated from a single piece of material, the center of suspension may be established with very fine tolerances using ordinary machining techniques. In the embodiment of the universal joint shown in FIGS. 1–5, the center of gravity of the flexure hinge is established by a symmetrical design and may be adjusted in the axial direction by means of the gimbal balance weights.

According to another design parameter, for embodiments having two gimbal elements the axis of one gimbal element is angularly offset about the spin axis ninety degrees relative to the corresponding axis of the other gimbal element. For example, colinear flexure axes 49 and 53 of rotor-attached flexure hinges 48 and 52 in FIG. 3 comprise one axis of gimbal element 20 and are preferably offset ninety degrees with respect to colinear flexure axes 65 and 69 of rotor-attached flexure hinges 64 and 68. Ease in achieving this design parameter is also one of the principal advantages of the universal joint of the invention. Because the universal joint is fabricated from a single piece of material, the angular offset of the flexure axis can be precisely controlled by ordinary machining techniques. Nonorthogonality between the flexure axis of one gimbal element relative to the flexure axis of the other gimbal element produces an effect known as angular or rotational quadrature for vibrations at twice the spin frequency. This effect is a bias shift occurring for angular vibrations at twice the spin speed which cannot be completely minimized by inertia adjustments alone. The torque is called quadrature because it acts at ninety degrees with respect to the torque produced by not adjusting the gimbal inertias according to equations (14) and (15). This torque which acts in quadrature is due to the nonorthogonality between the gimbals' axes of attachment.

In accordance with yet another design parameter the flexure axes of the gimbal elements will preferably intersect one another. In other words, there is preferably no skewness of the two flexure axes of each gimbal element. For example, colinear flexure axes 49 and 53 intersect colinear flexure axes 25 and 45. Ease of achievement of this design parameter is a major advance of the universal joint of the invention. Skewness of the flexure axis would result in a different pendulosity of the rotor about one axis of the universal joint relative to the other axis. This separation of axes would cause a bias shift to occur for linear vibration acting along the case-fixed input axes at twice the spin speed. It is possible to cancel the adverse effect of the skewness by adjustment. See, for example, U.S. Pat. No. 3,538,776. However, the substantially complete achievement of this design parameter of the universal joint of the invention renders such adjustments virtually unnecessary. If there is any drift of this sort in the universal joint of the invention, it can be eliminated by differentially adjusting the centers of gravity of the gimbals by adjusting their balance weights. However, any reduction in the amount of gimbal pendulosity adjustment needed to cancel this error source is beneficial. For a given range of adjustment of the balance weights in the gimbal elements, a reduced requirement to eliminate gimbal pendulosity at twice the spin speed means that more of the range of adjustments remains for other purposes.

According to still another design parameter for two-gimbal embodiments the two flexure axes of each gimbal element are preferably orthogonal with respect to one another.

If they are not orthogonal and if a skewness exists, bias shift proportional to steady accelerations in a radial direction will be caused since a torque develops about the same axis as the applied acceleration. This effect is called quadrature unbalance because the torque from this error source is orthogonal to a torque resulting from mass unbalance. A gyro having either a quadrature unbalance or a mass unbalance is sensitive to gravity, or accelerations, acting at right angles to the spin axis.

Quadrature unbalance can also be caused not only by nonorthogonality between the rotor-attached flexure axis and the shaft-attached flexure axis of each gimbal element but also by skewness, as discussed above, in combination with the nonorthogonality of corresponding axes of the two gimbal elements.

DESCRIPTION OF AN EMBODIMENT OF THE INVENTION HAVING THREE GIMBAL ELEMENTS

There is shown in FIGS. 11 and 12 a second embodiment of the invention having three gimbal elements. It is to be understood, however, that the principal of the invention is general and the design of the gimbal elements may vary widely. For example, the shape of the gimbal elements may be varied, gimbal elements need not be symmetrically shaped, the gimbal elements may cross over one another or they may not cross over, the gimbal elements need not be equiangularly spaced, and the gimbal elements need not have identical moments of inertia.

FIGS. 11 and 12 show three gimbal elements equiangularly spaced about an axis of rotation with each gimbal element spanning an angle of ninety degrees about that axis. FIG. 11 is a plan view primarily showing the rotor element of the universal joint and FIG. 12 is a plan view primarily showing the drive element of the universal joint.

Universal joint 200 is a one-piece universal joint made in accordance with the principles of the invention and comprising a drive element 202 having an axis of rotation 203, a rotor element 204 having an axis of rotation 205, three identical gimbal elements 206, 208 and 210, and six flexure hinges each having two radially separated parts with a common flexure axis. Drive element 202 has a bore for receiving a drive element (not shown). Universal joint 200 may be used in a tuned gyro such as the gyro shown in FIG. 5. In other words, the embodiment shown in FIGS. 11 and 12 may be substituted for universal joint 10 in any application including the one discussed above and shown incorporated in the tuned gyro of FIG. 5. Universal joint 200 is fabricated in accordance with the method described below for fabrication of the preferred embodiment shown in FIGS. 15-19.

In the embodiment shown in FIGS. 11 and 12 the three gimbal elements are each connected to drive element 202 and to rotor element 204 by a pair of flexure hinges. The flexure hinges of universal joint 200 are of the same type as the flexure hinges of universal joint 10 with each flexure hinge having a flexure axis and a longitudinal axis. In this embodiment each flexure hinge comprises a pair of necked-down portions of material. Each flexure hinge is formed by forming a pair of parallel holes in the same manner as described above for the first embodiment shown in FIGS. 1-5. The flexure hinge formed by the material between the pair of adjacent parallel holes is separated into two radially separated parts during the fabrication process by a cut with an electrical discharge machine. This separation cut is discussed in more detail below.

The flexure hinges of universal joint 200 and of other embodiments of the invention may be formed by drilling parallel holes or by the use of an electrical discharge machine technique or by any other suitable technique. The cross section of each hole need not be a full circle if electrical discharge machine techniques are used, for example. Also, the curvature of the two walls of the necked-down portion of each hinge need not be that of a circle.

Figure 11A:
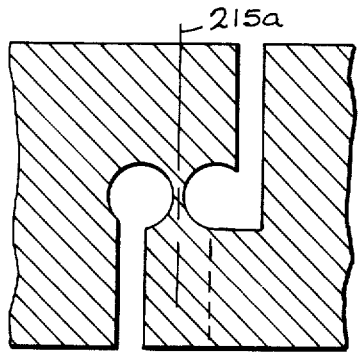
FIGS. 11A through 11F are partial sectional views taken along the lines 11A through 11F in FIG. 11.
Figure 11B:
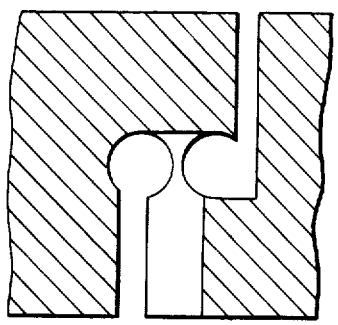

Flexure hinge 212 integrally connects gimbal element 206 to rotor element 204. Flexure 212 has two radially separated parts, namely hinges 212a and 212b. Flexure hinges 212a and 212b have a common flexure axis 213 and longitudinal axes 215a and 215b. Longitudinal axis 215a is shown in FIG. 11A. Axes 215a and 215b are parallel to one another and are parallel to axes of rotation 203 and 205 when the universal joint is in a null position. Recall that in the null position there is no rotation of any gimbal element about its flexure axis. Flexure hinges 212a and 215b each have a cross axis as defined above for flexure hinge 24 but not shown in FIGS. 11 and 12.

Similarly, gimbal element 208 is connected to rotor element 204 by a flexure hinge 216 having two parts, namely flexure hinges 216a and 216b. Flexure hinges 216a and 216b have a common flexure axis 217 and they have parallel longitudinal axes 219a and 219b. When the universal joint is in a null position, axes 219a and 219b are also parallel to axes 203 and 205 and to the longitudinal axes at the other hinges.

Flexure hinge 220 is a third flexure hinge which connects gimbal element 210 to rotor element 204. Flexure hinge 220 also has two parts, namely flexure hinges 220a and 220b. Flexure hinges 220a and 220b have a common flexure axis 221 and a pair of parallel longitudinal axes 223a and 223b.

Each flexure hinge connecting a gimbal element to drive element 202 is similar to the rotor-attached flexure hinge for that gimbal element but is offset about the axes 205 and 203 by an angle of ninety degrees. For example, flexure hinge 224 connects gimbal element 206 to drive element 202 and has a flexure axis 225 offset ninety degrees from axis 213 about axes of rotation 203 and 205. Flexure hinge 224 has two parts, namely flexure hinges 224a and 224b. Flexure hinges 224a and 224b have longitudinal axes 227a and 227b, respectively, which are parallel to one another and also parallel to axes of rotation 203 and 205 when the universal joint is in the null position.

Flexure hinge 228 integrally connects drive element 202 and gimbal element 208. Flexure hinge 228 has two parts, namely flexure hinges 228a and 228b. Flexure hinges 228a and 228b have a common flexure axis 229 and parallel longitudinal axes 231a and 231b, respectively. The longitudinal axes 231a and 231b are parallel to axes of rotation 203 and 205 when the universal joint is in the null position.

Figure 11C:
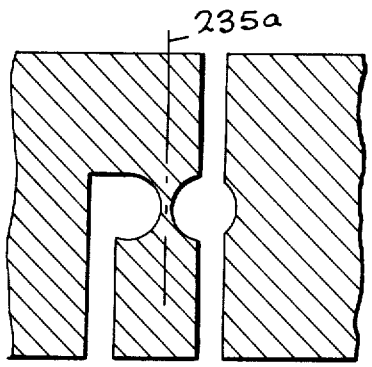
Figure 11D:
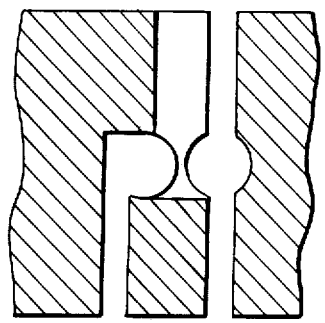

Flexure hinge 232 connects gimbal element 210 to drive element 202. Flexure hinge 232 has two parts, namely flexure hinges 232a and 232b. Flexure hinges 232a and 232b have a common flexure axis 233 and parallel longitudinal axes 235a and 235b, respectively. Longitudinal axes 235a and 235b are parallel to axes of rotation 203 and 205 when the universal joint is in the null position. Longitudinal axis 235a is shown in FIG. 11C.

All the flexure axes 213, 217, 221, 225, 229 and 233 intersect axes of rotation 203 and 205 at a common point. All of the longitudinal axes 215a and 215b, and 219a and 219b, 223a and 223b, 227a and 227b, 231a and 231b, and 235a and 235b are parallel to one another and parallel to axes of rotation 203 and 205 when the universal joint is in the null position.

Consider now certain other features of the embodiment shown in FIGS. 11 and 12. Each gimbal has a threaded aperture therein and two balance weights for adjusting gimbal inertia. Gimbal element 206 has an aperture 238 and a pair of balance weights 240a and 240b therein. Each balance weight is a screw rotatable in the threaded aperture. Gimbal element 208 has a threaded aperture 242 and a pair of balance weights 244a and 244b therein. Similarly, gimbal element 210 has a threaded aperture 246 and a pair of balance weights 248a and 248b therein. Adjustment of one of the weights in each aperture is achieved by an access hole through the other weight. For example, access to balance weight 240b is accomplished through a hole in balance weight 240a.

Figure 11E:
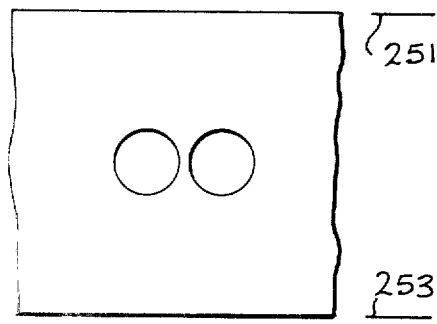
Figure 11F:
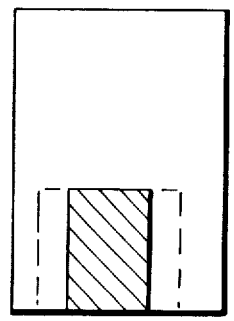

In this embodiment drive element 202, rotor element 204 and gimbal elements 206, 208 and 210 each have a pair of end surfaces which are axially displaced from one another, one transverse end surface of drive element 202, rotor element 204, gimbal element 206, gimbal element 208, and gimbal element 210 is in transverse plane 251, and the other transverse surface of each of these elements is in transverse plane 253. Transverse planes 251 and 253 are shown in FIG. 11E. In other words, there is no axial displacement among those end surfaces of drive element 202, rotor element 204, and gimbal elements 206, 208 and 210 which are situated in the same axial direction along axes 203 and 205 from the intersection of all the flexure axes of the hinges.

It will be appreciated from FIGS. 11 and 12 that the center of gravity of universal joint 200 is at its geometric center, i.e. at the intersection of the flexure axes with the axes of rotation. The intersection of the flexure axes with the axes of rotation is known as the center of suspension.

Drive element 202 has three equiangularly spaced arms. For a universal joint having three gimbal elements the preferred spacing between the flexure axes of the flexure hinges connecting each gimbal element to the driving element is 120°. For such a universal joint the preferred spacing between the flexure axis of the flexure hinge connecting each gimbal element to the driving element and the flexure axis of the flexure hinge connecting that gimbal element to the rotor element is 90°. According to this preferred spacing of flexure hinges, the flexure hinges connecting each gimbal element to the rotor element would have their flexure axes spaced apart 120° about the spin axes of the rotor element and the driving element.

As described above each flexure hinge in the embodiment shown in FIGS. 11 and 12 has two radially separated parts. Each flexure hinge of the three gimbal embodiment is formed by drilling a pair of parallel apertures in accordance with the method discussed below. Slot cuts are made according to this method for the purpose of removing a center section of the necked-down portion of material forming each flexure hinge. Removal of a section of the necked-down portion of material reduces the torsional stiffness of the flexure hinge to a desired value. The two parts of each flexure hinge remaining after a slot cut are preferably radially separated by as large a distance as possible in order to provide the universal joint with a high axial stiffness.

The operation of the second embodiment shown in FIGS. 11 and 12 is similar to the operation of the first embodiment shown in FIGS. 1-5 as discussed above. More particularly, a gyroscope incorporating the second embodiment shown in FIGS. 11 and 12 would preferably be operated as a tuned, free-rotor gyro and would preferably be adjusted to eliminate error due to sensitivity to shaft vibrations that occur at a frequency equal to twice the spin frequency. In other words, a gyro having three gimbal elements is operated in a manner which satisfies equations similar to (12) and (13) above. In a multigimbal universal joint each gimbal element produces an error moment having a magnitude and direction. If the gimbal elements are symmetrical, the magnitude of the error moments will be substantially identical. Therefore, the angular spacing of the gimbal elements about the rotor spin axis may be selected and adjusted so that the resultant of all these moments produced by the individual gimbal elements is equal to zero. A universal joint having three gimbal elements is described in U.S. Pat. No. 3,678,764. The characteristics of such a device are also discussed in a paper entitled "Dynamically Tuned Gyros in Strapdown Systems," presented at the Advisory Group for Aerospace Research and Development Conference on Inertial Navigation Components and Systems, Oct. 2–5, 1972, and in a paper entitled "Theory of Errors of a Multigimbal-Elastically Supported, Tuned Gyroscope," published in the IEEE transactions on Aerospace and Electronic Systems, Volume AES-9, No. 3, May, 1972, both papers authored by Robert J. G. Craig. In the embodiment shown in FIGS. 11 and 12, the moments of inertia of the gimbal elements are controlled by adjustment of balance weights 240, 244 and 248.

In FIG. 13 there is shown a multisensor 300 for sensing both linear accelerations and angular displacements incorporating two universal joints. Of the gyroscopes described above, each utilizes a rotor element which is insensitive to linear acceleration. The rotor element may be made sensitive to linear acceleration, if desired, by making it pendulous, i.e. by displacing its center of mass to one side of the plane of its attachment to its shaft. Multisensors are described more completely in U.S. Pat. Nos. 3,678,764 and 3,382,726. Multisensor 300 has two gyroscopes, one pendulous and one non-pendulous, mounted on the same driving shaft. The pendulous gyroscope utilizes a universal joint 10a, identical to universal joint 10 described above, but having its center of gravity 301 adjusted to a point displaced along the axis of the drive shaft 302 from the center of suspension 303a. The non-pendulous gyroscope has its center of gravity located at the center of suspension 303 of universal joint 10. Universal joint 10 is described above. The pendulous gyroscope measures both angular and linear accelerations. All the other adjustments of the balance weights of universal joint 10a are identical to the adjustments of universal joint 10 as described above. The non-pendulous gyroscope senses only angular displacements. The signal representing only angular displacements is subtracted from the signal representing both linear accelerations and angular displacements to produce a signal which is a measure and representative of only linear accelerations. The multisensor of FIG. 13 incorporates inertial wheels and is in general similar to the gyroscope shown in FIG. 5 except that it is double-ended, i.e. it has two inertial wheels, two sets of torquers and two sets of pickoffs, etc. but a single drive motor.

A pendulous gyro on one end of a multisensor may be simply produced by adjusting rotor weights in the inertial wheel (not shown) and to some extent by the balance weights of universal joint 10a along the spin axis of drive shaft 302. For example, if all of the rotor weights are axially displaced along the spin axis the center of graity can be moved from the center of suspension to make the gyro pendulous.

Multisensor 300 is an instrument capable of measuring angular rates each of two sensitive axes as well as linear acceleration along these same sensitive axes. This is accomplished by two inertial wheels 304 and 306, freely suspended from a single motor driven shaft 302, one balanced and having high annular momentum to measure rates, the other pendulous along the spin axis and having low angular momentum to measure acceleration. Each inertial wheel has its associated pickoffs and torquers sensitive about two principal axes. Electronics (not shown) may be used to provide amplification of gyro output signals and a closed two-axis servo loop for the accelerometer rotor. Torquer currents monitored externally to the multisensor are a measure of accelerations.

The multisensor may be constructed by enclosing the motor stator between two housing halves and welding the parts together. Precision ball bearings 310 support the shft 302 which carries both gyro and accelerometer inertial wheels and the hysteresis ring 312. A combination limit stop and dynamic balance plate 314 is attached to and rotates with each rotor element. Pickoffs and torquers (not shown in FIG. 13) are conventionally mounted directly to the case in the manner shown in FIG. 5. Each inertial wheel may have screw adjustments for other sources of unbalance such as radial unbalance and mass unbalance. The gimbal elements have screw adjustments for resonant frequency and twice spin vibration sensitivity, both translational and rotational. Covers 320 and 322 provde a vacuum seal and a magnetic shield.

DESCRIPTION OF THE PREFERRED EMBODIMENT OF THE INVENTION AND THE PREFERRED METHOD OF MAKING IT

Consider now the method of making the preferred embodiment of the universal joint of the invention. It is to be understood that although the method of making the universal joint is described for the preferred embodiment, the method may also be applied to the fabrication of the embodiment shown in FIGS. 1–5 and the embodiment shown in FIGS. 11 and 12 and to the fabrication of other embodiments of the universal joint of the invention. It is also to be understood that some of the method steps described below are optional and that the order of the various operations may be varied by one skilled in the art without depparting from the concept of the invention.

The preferred embodiment has flexure hinges located near the perimeter of the rotor element to facilitate measurement of the thickness of the necked-down portions of material comprising the flexure hinges. Measurements of these thicknesses are utilized in calculating the positive spring rate of each gimbal element. Recall that the positive spring rate of the flexure hinges and the counteracting moments of inertia of the gimbal elements which are effectively negative spring rates are caused to cancel each other by the procedure described above as "tuning" the gyro.

A one-piece universal joint may be fabricated from a round bar stock of a material such as a high carbon alloy steel or other similar material having high strength. The diameter of the bar will of course determine the outer diameter of the driven element of the universal joint to which an inertial wheel will be attached.

Referring now to FIG. 14 and to FIG. 15, a blank 400 of material is cut from bar stock. The thickness of the blank will be controlled by design considerations for the ultimate use of the universal joint. In a gyroscope the diameter of the driving shaft and the size of the inertial wheel will be primary factors in determining the thickness and diameter of the blank 400 from which the universal joint is fabricated.

A hole 402 having a center axis 403 colinear with the center axis of cylindrically shaped blank 400 is bored from either side of the blank. The diameter of hole 402 is selected so that blank 400 may later be mounted on a drive shaft (not shown).

Chordal slots 404a, 404b, 404c and 404d, as shown in FIG. 15 are milled at a spacing of ninety degrees from one another about center axis 403. The four chordal slots 404 each provide a planar surface to facilitate the drilling of parallel holes.

Next, four pairs of parallel holes are drilled in blank 400. One pair of holes 408 and 410 will form a necked-down portion 406 of material which will ultimately comprise two radially separated flexure hinges having a common flexure axis 407. Holes 408 and 410 are shown by way of example in FIGS. 14 and 15 in a two-gimbal element embodiment. The centerlines of the remaining three pairs of parallel holes are preferably equiangularly spaced at 90° intervals about center axis 403 from the centerline 407 between holes 408 and 410. The centerlines of all eight of the individual holes are coplanar in a plane transverse to axis 403. The centerline of each individual hole of each pair of holes extends at the same distance from its flexure axis. For example, centers 409 and 411 of holes 408 and 410, respectively, are at equal distances from centerline 407 which is also the flexure axis of the flexure hinges being fabricated. Cross axis 412 is perpendicular to the flexure axis 407. Each necked-down portion of material has a longitudinal axis which is perpendicular to the corresponding flexure axis and is parallel to center axis 403. For example, necked-down portion 406 has a longitudinal axis 413. Each pair of holes is drilled to a predetermined depth in blank 400 but could alternatively be drilled all the way through the blank. Of course, if holes were drilled all the way through the blank, spaced ninety degrees around the center axis 403, only two pairs of holes would be needed to produce the four necked-down portions. The depth of the holes is a matter of design choice and the desired stiffness for the flexure hinge is of course a prime consideration in determining a depth.

Three additional necked-down portions 414, 416 and 418 of material are identical to necked-down portion 406 of material and are formed in the manner described above. Each necked-down portion of material so formed will ultimately be separated into two flexure hinges by electrical discharge machine cuts. For example, necked-down portion 406 will later be cut into a flexure hinge connecting one gimbal element to a driving element and another flexure hinge connecting the other gimbal element to a rotor element.

In the next step, eight holes 420, 422, 424, 426, 428, 430, 432 and 434 are drilled and tapped in blank 400. Of these holes, the center of each is at an equal distance from axis 403 and the holes have centerlines parallel to axis 403. The purpose of these holes is to receive adjustable balance weights as discussed above. The location of the holes is a function of the design of a particular embodiment being fabricated.

Blank 400 may next be subjected to a heat treatment to increase its hardness. Heat treating is well known in the art.

According to the preferred method of the invention, blank 400 is next precisely dimensioned. The cylindrical surface of the blank may be ground to a precise outer diameter. The sides of the blank may be lapped to be precisely parallel. Aperture 402 may be ground to a precise inner diameter. Each pair of holes for forming a flexure hinge may be ground to define the flexure hinge to be formed more precisely. For example, holes 408 and 410 may be ground to a larger diameter and/or holes 408 and 410 may be ground to decrease the distance between their centerlines 409 and 411. Preferably, the centerlines 409 and 411 of holes 408 and 410, respectively, are maintained equidistant from flexure axis 407.

Next, the electrical discharge machine techniques are utilized to produce axially oriented slots in blank 400. The electrical machining process is well known in the industry and electrical discharge machines are available from various sources. For example, a Charmilles D10 electrical discharge machine may be utilized with electrodes especially designed to make the slot cuts in blank 400.

A handbook of machining procedures entitled "Electrical Machining, Spark-Erosion Machines, Technology Generators" is available from the Charmilles Engineering Works Ltd., Geneva, Switzerland. Electrical discharge machining is described in a book entitled "Electrical Discharge Machining for the 1970's" by Leland J. Quackenbush and William N. Lawrence. The book is available from the Industrial Development Division Institute of Science and Technology, The University of Michigan, 2200 North Campus Blvd., Ann Arbor, Mich. 48105, U.S.A.

Turning now to FIGS. 16, 17 and 18 there are shown three views which show the structure of the preferred embodiment and the electrical discharge machine cuts. For example, slots 433a, 433b, 433c and 433d which pass all the way through blank 400 may be produced by one electrical discharge machine electrode. Slots 435 may be made by another electrode. It is pointed out that slots 435a and 435b do not extend all the way through blank 400. The relative depth of some of the slot cuts from the end surfaces are shown in FIG. 17. The order of making slot cuts of course may be varied. Also, it would of course be possible to vary the design of the electrodes. For example, all six slots 433 and 435 could be made by one integral "cookie-cutter" type electrode. The side of blank 400 from which slots 435 are cut will hereinafter be referred to as the first side.

Referring now to FIG. 18, the blank 400 is turned over to position it for cutting from the opposite side from slots 435 (hereinafter referred to as the second side of the blank 400). Slots 437a and 437b extend partially through blank 400 in an axial direction and have concentric walls in the radial direction.

Slots 439a, 439b, 439c and 439d comprise four identical, equiangularly spaced slots cut all the way through blank 400 in the axial direction and having concentric walls in the radial direction.

Similarly, slots 441a, 441b, 441c and 441d comprise four identical, equiangularly spaced slots which are cut entirely through blank 400 in the axial direction and which have concentric walls in the radial direction.

Slots 443*a*, *b*, *c* and *d*, *e*, *f*, *g* and *h* are cut all the way through blank 400 in the axial direction and each have parallel walls extending to a generally radial direction. There are a total of eight slots 443 formed in one cut of the electrode of the electrical discharge machine.

Next, blank 400 is placed with the first side uppermost as shown in FIG. 16. Slots 445 are cut part of the way through blank 400 in the axial direction and each have parallel walls extending in a generally radial direction. There are four slots 445*a*, *b*, *c* and *d*.

Next, four slots 447*a*, 447*b*, 447*c* and 447*d* are cut from the second side as shown in FIG. 18. Slots 447 correspond to slots 445 but are rotated 90° about axis 403 and are on the opposite side of blank 400 from slots 445. Each slot 447 extends only part of the way through blank 400 in the axial direction and has a pair of parallel walls extending in a generally radial direction.

Slots 449 are cut partially through blank 400 in the axial direction from the first side. There are two different shapes of slots made by this cut, slots 449*a*, *b*, *c*, *d* of one shape and slots 449*e*, *f*, *g* and *h* of another.

Slots 451*a*, *b*, *c*, *d*, *e*, *f*, *g* and *h* total eight in number and correspond to slots 449*a*, *b*, *c*, *d*, *e*, *f*, *g* and *h*, respectively, but are cut from the second side of blank 400 and are offset 90° with respect to slots 449. Each slot 451 is cut only part of the way through blank 400 in an axial direction.

Slots 453 are cut with one electrode from the first side. There are four slots 453*a*, *b*, *c* and *d* each passing part of the way through blank 400 in an axial direction. Slots 455 are cut from the second side of the blank and are offset 90° with respect to slots 453. There are four slots 455*a*, *b*, *c* and *d* each cut only a part of the way through blank 400 in an axial direction.

Once more, blank 400 is turned over and a pair of slots 457*a* and 457*b* are cut from the first side each extending only a part of the way through blank 400 in an axial direction.

Slots 459*a* and *b* correspond to slots 457*a* and *b* but are cut from the second side of the blank and are offset ninety degrees about axis 403 with respect to slots 457*a* and *b*, respectively.

Slots 461*a*, *b*, *c* and *d* are cut all the way through blank 400.

Blank 400 is now at a stage where the gimbal elements are separated by slots from a drive element and a rotor element except for the integral flexure hinges connecting the various elements and except for the material at the points where gimbals cross over.

If integral stops are omitted in the design, a stop plate may be temporarily cemented to blank 400 to prevent excessive stresses during the fabrication process, especially during the step when the gimbal elements are separated from one another. However, where integral stops are used for preventing excessive stress, the stop plate is not utilized.

As pointed out above, isoelasticity of the suspension means should be a design goal. The axial and radial translational stiffnesses, i.e. compliance, of the suspension means should be as nearly equal as possible. In attempting to obtain isoelasticity in the axial and radial directions, the stiffness of the entire suspension means coupling the rotor element to the drive element is considered. For the universal joints of the invention the translational stiffness is usually greater in the axial direction, i.e. along the axes of rotation of the driving element and the driven or rotor element. One may therefore weaken the suspension means axially to adjust the axial stiffness to be equal to the radial stiffness. For example, the axial stiffness may be weakened by forming slots in the section of a gimbal element opposite either a rotor-attached or opposite a shaft-attached flexure hinge. Slots 463*a* and *b*, as shown in FIG. 16, weaken the axial stiffness of one gimbal element. These slots are formed from a first side of blank 400 and extend partially through the blank toward flexure hinges 418 and 414, respectively. Similarly, slots 465*a* and 465*b* are formed in the second side of blank 400, as shown in FIG. 18. Slots 465*a* and *b*, as shown in FIG. 18, similarly extend from the second side partially through the blank and are located opposite flexure hinges 416 and 406, respectively. Slots 463*a* and *b* and 465*a* and *b* weaken the suspension means in the axial direction by effectively decreasing the stiffness of the connections to the driving element. Alternatively, other slots could be utilized to weaken the translational stiffness of connections to the rotor element.

Referring to FIG. 3, similar slot cuts could be made in the U-shaped sections of gimbal elements 18 and 20 to weaken the axial compliance of the suspension means. Such a slot cut would be made in the "bottom of the U" opposite each of the flexure hinges 48, 52, 64 and 68 to weaken the connection to driving element 12.

The size of the slot cuts for adjusting isoelasticity may be calculated from well-known principles and may be varied by experiment to adjust the axial compliance to be equal to the radial compliance of a suspension means.

The slot cuts to adjust isoelasticity may be formed by removing material by standard machining procedures such as drilling, boring, milling, electrical discharge machine techniques, or by the use of laser techniques.

In FIGS. 16 and 18 there are shown in phantom the shape of an electrode for cutting four radial slots 467*a*, *b*, *c* and *d* with an electrical discharge machine. These slots separate the gimbal elements. FIG. 19 shows one such slot. For a universal joint having two gimbal elements for slots would be cut at equiangular spacing around axis 403 to separate the gimbal elements from each other.

FIGS. 16 and 18 show in phantom the depth of the four slotos 467*a*, *b*, *c* and *d*. Optionally, the shape of the electrode will leave a post shown in phantom in FIG. 16. A final slot 469 is cut with a thin electrode to separate each post into two portions 466 and 468 with each portion being integrally attached to a different gimbal element. These two slots are repeated at ninety degree intervals about axis 403 to form gimbal elements 470 and 472 (adjustment screws not shown).

Gimbal element 470 is flexibly connected to driving element 474 by two flexure hinges having colinear flexure axes and to rotor element 476 by two flexure hinges also having colinear flexure axes. Gimbal element 472 is flexibly connected to driving element 474 by two flexure hinges having colinear flexure axes and to rotor element 476 by two flexure hinges also having colinear flexure axes. The flexure hinges are shown in phantom in FIGS. 16 and 18. The flexure hinges of the preferred embodiment have flexure axes, cross axes and longitudinal axes located according to the conditions described above for orientation of corresponding axes of the embodiment shown in FIG. 3.

The embodiments of the universal joint of the invention described thus far have each incorporated flexure hinges having longitudinal axes substantially parallel to the axis of rotation of a driving element when the universal joint is in the null position. However, it is to be understood that it is also within the scope of the invention to position the centers of each pair of parallel holes forming a necked-down portion of material so that the centers are axially offset and not coplanar in a plane transverse to the axis of rotation of the driving element. More specifically, if the centers of each pair of holes forming a flexure hinge are axially offset so that the flexure axes of all of the flexure hinges are still coplanar in a plane transverse to the axis of rotation of a driving element, the necked-down portion of material of each flexure hinge will have a longitudinal axis which is substantially perpendicular to the axis of rotation of the driving element when the universal joint is in a null position. This fourth embodiment of the invention may be fabricated by using the techniques disclosed herein.

In FIG. 20 there is shown broken away a universal joint 500 wherein each flexure hinge has its longitudinal axis in a plane substantially perpendicular to the axis of rotation of the driving element and substantially perpendicular to the axis of rotation of the driven element. Only one flexure hinge is shown in FIG. 20 but any of the three embodiments described above and other embodiments may be made with flexure hinges each having the orientation with respect to the spin axes as shown in FIG. 20.

In FIG. 20 universal joint 500 has a drive axis 501 of rotation corresponding to axis 13 of the universal joint 10 as shown in FIG. 1 and a driven axis 503 of rotation corresponding to axis 15 in FIG. 1. There is shown a flexure hinge 504 having a flexure axis 505 and a longitudinal axis 507 which are both in a plane substantially perpendicular to axes 501 and 503 when flexure hinge 504 is in a null position. Flexure hinge 504 is formed by drilling or otherwise making a pair of apertures 508 and 510. Apertures 508 and 510 have centerlines 509 and 511, respectively. Centerlines 509 and 511 are offset from flexure axis 505 an equal distance and they are parallel to flexure axis 505. Flexure hinge 504 has a cross axis 513 parallel to axes 501 and 503 when universal joint 500 is in the null position. The longitudinal axes of a universal joint having all of its flexure hinges oriented with respect to the driven and driving axes of rotation, as shown in FIG. 20, are coplanar. That is, the longitudinal axes would all lie in a plane perpendicular to the driven and driving axis of rotation assuming that the centers of the apertures forming the flexure hinges all lie in a pair of parallel planes.

What is claimed is:

1. In a universal joint:
   a. a driving element having a first axis of rotation;
   b. a driven element having a second axis of rotation;
   c. at least a pair of gimbal elements each coupled to said driving element and to said driven element; and
   d. a plurality of flexure hinges for coupling each said gimbal element to said driving element and to said driven element, said flexure hinges flexing to permit small angular misalignment between said first and second axes of rotation, each said flexure hinge having a flexure axis, a cross axis and a longitudinal axis, said cross axis being perpendicular to the flexure axis and colinear with a line extending from one wall of the flexure hinge to the other between points of minimum thickness, said longitudinal axis being perpendicular to said flexure axis and to said cross axis, first ones of said plurality of flexure hinges flexibly connecting said gimbal elements to said driving element, each said first flexure hinge having a flexure axis radially extending from said first axis of rotation, second ones of said plurality of flexure hinges flexibly connecting said gimbal elements to said driven element, each said second flexure hinge having a flexure axis radially extending from said second axis of rotation said flexure hinges being oriented so that each of said longitudinal axes forms an angle of substantially the same magnitude with said first and second axes of rotation when said first and second axes of rotation are colinear one with the other.

2. The device as claimed in claim 1 wherein said flexure hinges are oriented so that the angle formed between each said longitudinal axis and said axes of rotation is substantially 0°.

3. The device as claimed in claim 2 further including a drive shaft, an inertial wheel and a means for rotating said drive shaft, said drive shaft connected to said driving element, said inertial wheel connected to said driven element wherein a resulting device comprises a gyroscope for sensing angular motions.

4. The device as claimed in claim 3 further including a second, pendulous inertial wheel element connected to rotate with said driving element by at least a second pair of gimbal elements and a second plurality of flexure hinges wherein the resulting device comprises a multisensor for generating signal respresentative of angular motions and linear accelerations.

5. The device as claimed in claim 4 wherein each said stop is an integral part of a gimbal element.

6. The device as claimed in claim 1 wherein said flexure hinges are oriented so that the angle formed between each said longitudinal axis and said axes of rotation is substantially ninety degrees.

7. The device as claimed in claim 1 wherein said driven element comprises a rotor element of a gyroscope, said rotor element having a second axis of rotation, said gimbal elements substantially isolating said rotor element whenever said driving element deflects about at least one of said flexure axes, said gimbal elements isolating said rotor element from angular motions of said driving element about an axis perpendicular to said first axis of rotation.

8. The device as claimed in claim 7 wherein said plurality of flexure hinges are positioned with respect to said driving element and with respect to said rotor element so that the flexure axis of each said first flexure hinge connecting each gimbal element to said driving element is angularly offset about said axes of rotation with respect to the flexure axis of a second flexure hinge connecting that gimbal element to said rotor element.

9. The device as claimed in claim 7 wherein said plurality of flexure hinges are positioned with respect to said driving element and to said rotor element so that the flexure axis of each said first flexure hinge is angularly offset about said axes of rotation with respect to the flexure axis of each other said first flexure hinge and so that the flexure axis of each said second flexure hinge is angularly offset about said axes of rotation with respect to the flexure axis of each other said second flexure hinge.

10. The device as claimed in claim 7 wherein said driving element and said rotor element are substantially isolated from one another by three gimbal elements, each said gimbal element being connected to said driving element by at least one said first flexure hinge and connected to said rotor element by at least one said second flexure hinge.

11. The device as claimed in claim 7 wherein the principal moments of inertia of said gimbal elements and the spring constants of said flexure hinges are predetermined to cause said rotor element to have substantially the characteristics of a free rotor.

12. The device as claimed in claim 7 wherein each said flexure hinge has a cross-sectional area perpendicular to its flexure axis which includes a necked-down portion of material, said cross-sectional area being symmetrical about said longitudinal axis.

13. The device as claimed in claim 1 wherein said driving element, said rotor elements, said gimbal elements and said plurality of flexure hinges comprise one integral piece of material.

14. The device as claimed in claim 13 wherein said driven element comprises a rotor element of a gyroscope, said rotor element having a second axis of rotation, said gimbal elements substantially isolating said rotor element whenever said driving element deflects about at least one of said flexure axes.

15. The device as claimed in claim 14 wherein each said flexure hinge comprises a compliant portion formed between a pair of apertures, the apertures having walls substantially parallel to its flexure axis.

16. The device as claimed in claim 15 wherein said plurality of flexure hinges are positioned with respect to said driving element and with respect to said rotor element so that the flexure axis of each said first flexure hinge connecting each gimbal element to said driving element is angularly offset about said axes of rotation with respect to the flexure axis of a second flexure hinge connecting that gimbal element to said rotor element.

17. The device as claimed in claim 16 wherein said plurality of flexure hinges are positioned with respect to said driving element and to said rotor element so that the flexure axis of each said first flexure hinge is angularly offset about said axes of rotation with respect to the flexure axis of each other said first flexure hinge and so that the flexure axis of each said second flexure hinge is angularly offset about said axes of rotation with respect to the flexure axis of each other said second flexure hinge.

18. The device as claimed in claim 17 wherein the principal moments of inertia of said gimbal elements and the spring constants of said flexure hinges are predetermined to cause said rotor element to have substantially the characteristics of a free rotor.

19. The device as claimed in claim 18 wherein the principal moments of inertia of said gimbal elements and the spring constants of said flexure hinges are selected to cause substantial cancellation of all constant torques generated by rectification of vibrations occurring at substantially twice the speed of rotation of said rotor element.

20. The device as claimed in claim 19 wherein said driving element and said rotor element are substantially isolated from one another by three gimbal elements, each said gimbal element being connected to said driving element by at least one said first flexure hinge and connected to said rotor element by at least one said second flexure hinge.

21. The device as claimed in claim 1 wherein a pair of gimbal elements include at least one pair of juxtaposed stops for limiting the rotation of said pair of gimbal elements about a preselected flexure axis, one of said pair of stops being mounted on each of said pair of gimbal elements, said stops having a gap between whenever said first and second axes of rotation are colinear and abutting one another whenever said pair of gimbal elements rotate about said preselected flexure axis with respect to one another through a predetermined angle and in a direction closing said gap.

22. A method for fabricating a one-piece universal joint having flexure hinges which flexibly interconnect intermediate elements with a driven element and with a driving element which has a rotational axis, the method comprising:
   a. forming a first set of axial slots from one surface of a blank to form portions of a driving element, a driven element, at least a pair of gimbal elements;
   b. forming a second set of axial slots from an opposite surface of the blank to form other portions of said driving element, said driven element, said gimbal elements, said first and second set of slots radially separating said elements from one another;
   c. forming a plurality of flexure hinges for rotatably connecting each said gimbal element to said driving element and for rotatably connecting each said gimbal element to said driven element; and
   d. forming another set of radial slots in said blank for axially separating said driving element, said driven element and said gimbal elements so that the remaining connections between said elements consist of said flexure hinges.

23. The method according to claim 22 and further comprising the step of forming a plurality of apertures in said blank, a first one of said apertures adapted to receive a drive shaft and the remaining ones of said plurality of apertures arranged in a predetermined pattern about said first aperture and each adapted to receive a balance weight.

24. The method according to claim 23 characterized in that the blank is a circular metal disc and the steps of forming the first and second sets of axial slots and the radial slots are performed such that the central portion of the disc becomes the driving element whose rotational axis coincides with the axis of the disc and such that the first one of said aperatures adapted to receive a drive shaft is an aperture in the driving element.

25. The method according to claim 22 wherein the step of forming a plurality of flexure hinges is performed prior to the step of forming a first set of axial slots.

26. The method according to claim 22 wherein the steps of forming said first set of slots and forming said second set of slots are interspersed by first forming some of the slots in said first set, then forming some of the slots in said second set, then forming others of the slots in said first set and then forming others of the slots in said second set.

27. The method according to claim 22 wherein the steps of forming said first and second sets of slots are interspersed by forming first ones of the slots in said first set, forming first ones of the slots in the said second set which are substantially identical in shape to said first ones in said first set, forming second ones of the slots in said second set and forming second ones of the slots in said first set which are substantially identical in shape to said second ones in said second set.

28. The method according to claim 22 wherein the step of forming a plurality of flexure hinges comprises forming a plurality of adjacent apertures according to said pattern, each pair of apertures having juxtaposed, substantially parallel walls for forming a flexure hinge therebetween, the flexure hinge having a flexure axis substantially parallel to said walls.

29. The method according to claim 22 and further comprising the step of forming a third set of axial slots from said surfaces of said blank for adjusting the axial translational stiffness of the universal joint to be substantially equal to its radial translational stiffness.

30. The method according to claim 26 wherein each slot in said third set of slots extends from one said surface partially through a gimbal element and is located in a gimbal element at a position opposite a flexure hinge.

31. A one-piece universal joint having at least a pair of gimbal elements made according to the process claimed in claim 22.

32. The method as claimed in claim 22 wherein the steps of forming a first set of axial slots, forming a second set of axial slots and forming another set of radial slots are each performed using electrical discharge machining technology.

33. The method according to claim 22 wherein each flexure hinge is formed by drilling a pair of adjacent holes in the blank.

* * * * *